US011320869B2

(12) United States Patent
Wang et al.

(10) Patent No.: US 11,320,869 B2
(45) Date of Patent: May 3, 2022

(54) HINGED KEYBOARD ACCESSORY HAVING MULTIPLE INSTALLATION MODES FOR A TABLET COMPUTING DEVICE

(71) Applicant: Apple Inc., Cupertino, CA (US)

(72) Inventors: Paul X. Wang, Cupertino, CA (US); Dinesh C. Mathew, San Francisco, CA (US); Keith J. Hendren, Cupertino, CA (US); Nicholas L. Qu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 99 days.

(21) Appl. No.: 16/942,622

(22) Filed: Jul. 29, 2020

(65) Prior Publication Data

US 2022/0035417 A1   Feb. 3, 2022

(51) Int. Cl.
*G06F 1/16*    (2006.01)
*G06F 3/0354*  (2013.01)
*G06F 3/0489*  (2022.01)
*G06F 3/0488*  (2022.01)

(52) U.S. Cl.
CPC ............ *G06F 1/1669* (2013.01); *G06F 1/165* (2013.01); *G06F 1/1616* (2013.01); *G06F 1/1632* (2013.01); *G06F 1/1677* (2013.01); *G06F 1/1681* (2013.01); *G06F 3/03545* (2013.01); *G06F 3/0488* (2013.01); *G06F 3/04897* (2013.01)

(58) Field of Classification Search
CPC .... G06F 1/1616; G06F 1/1632; G06F 1/1647; G06F 1/165; G06F 1/1669; G06F 1/1677; G06F 1/1681
See application file for complete search history.

(56) References Cited

U.S. PATENT DOCUMENTS

| | | | | | |
|---|---|---|---|---|---|
| 5,243,549 A | * | 9/1993 | Oshiba | ............ | G06F 1/1671 361/679.09 |
| 5,251,102 A | * | 10/1993 | Kimble | ............ | G06F 1/1616 361/679.09 |
| 5,477,129 A | * | 12/1995 | Myslinski | ............ | H02J 7/0047 340/636.1 |
| 5,594,617 A | * | 1/1997 | Foster | ............ | G06F 1/1616 361/679.02 |
| 5,898,600 A | * | 4/1999 | Isashi | ............ | G06F 1/169 708/105 |
| 6,073,187 A | * | 6/2000 | Jacobs | ............ | G06F 1/1616 361/679.27 |
| 6,116,767 A | * | 9/2000 | Chaiken | ............ | G06F 3/0605 345/169 |

(Continued)

*Primary Examiner* — Adrian S Wilson
(74) *Attorney, Agent, or Firm* — Brownstein Hyatt Farber Schreck, LLP

(57) ABSTRACT

An accessory device for a tablet computing device may include a base portion having one or more input devices (e.g., keyboards, trackpads, touchscreen displays, and the like) for providing inputs to the tablet computing device. The accessory device may include a coupling mechanism for releasably coupling the base portion of the accessory device to a tablet computing device in multiple different installation modes. The coupling mechanism may include an auxiliary display for providing a graphical output along a surface of the coupling mechanism. Additionally or alternatively, the coupling mechanism may include a recess for receiving a stylus.

20 Claims, 21 Drawing Sheets

(56) References Cited

U.S. PATENT DOCUMENTS

| | | | | |
|---|---|---|---|---|
| 6,392,871 B1 * | 5/2002 | Yanase | G06F 1/162 | 345/905 |
| 6,612,668 B2 * | 9/2003 | Doan | G06F 1/1616 | 16/303 |
| 6,643,124 B1 * | 11/2003 | Wilk | G06F 1/1616 | 312/223.1 |
| 6,654,234 B2 * | 11/2003 | Landry | G06F 1/1616 | 248/917 |
| 6,744,623 B2 * | 6/2004 | Numano | G06F 1/1632 | 345/87 |
| 6,792,480 B2 * | 9/2004 | Chaiken | G06F 3/0605 | 361/679.26 |
| 6,819,304 B2 * | 11/2004 | Branson | G06F 1/1615 | 345/1.3 |
| 6,819,961 B2 * | 11/2004 | Jacobs | G06F 1/1616 | 700/17 |
| 6,859,219 B1 * | 2/2005 | Sall | G06F 1/1607 | 345/1.1 |
| 6,862,171 B1 * | 3/2005 | Maskatia | G06F 1/1616 | 312/223.2 |
| 6,980,420 B2 * | 12/2005 | Maskatia | G06F 1/1616 | 248/917 |
| 7,016,183 B2 * | 3/2006 | Takemoto | G06F 1/162 | 312/223.2 |
| 7,106,579 B2 * | 9/2006 | Maskatia | G06F 1/1618 | 312/223.1 |
| 7,450,978 B2 * | 11/2008 | Park | H04M 1/0235 | 455/575.3 |
| 7,492,891 B2 * | 2/2009 | Eldon | G06F 1/1616 | 379/433.12 |
| 7,570,482 B2 * | 8/2009 | Chan | G06F 1/1692 | 361/679.21 |
| 7,599,178 B2 | 10/2009 | Huang et al. | | |
| 7,667,959 B2 * | 2/2010 | Pelkonen | G06F 1/1683 | 361/679.27 |
| 7,787,914 B2 * | 8/2010 | Ahn | H04M 1/022 | 455/575.3 |
| 7,831,276 B2 | 11/2010 | Rajendra | | |
| 8,208,249 B2 * | 6/2012 | Chin | H04M 1/022 | 361/679.27 |
| 8,289,687 B2 * | 10/2012 | Weinstein | G06F 1/1666 | 361/679.3 |
| 8,467,183 B2 | 6/2013 | Probst et al. | | |
| 8,995,116 B2 | 3/2015 | Hung et al. | | |
| 9,137,913 B2 * | 9/2015 | Hsu | F16M 11/00 | |
| 9,785,198 B2 * | 10/2017 | Grinstead | G06F 1/1681 | |
| 10,976,779 B1 * | 4/2021 | Tsai | G06F 1/1654 | |
| 2004/0108968 A1 * | 6/2004 | Finke-Anlauff | G06F 1/1669 | 345/1.1 |
| 2009/0034173 A1 * | 2/2009 | Shaum | G06F 1/1616 | 361/679.28 |
| 2009/0190295 A1 * | 7/2009 | Chin | H04M 1/022 | 361/679.27 |
| 2010/0039764 A1 * | 2/2010 | Locker | G06F 1/1669 | 361/679.29 |
| 2018/0210507 A1 * | 7/2018 | Morrison | G06F 1/189 | |
| 2019/0129476 A1 * | 5/2019 | Alva | F03G 7/06 | |
| 2021/0173440 A1 * | 6/2021 | Takahashi | G06F 1/1628 | |
| 2021/0356990 A1 * | 11/2021 | Cha | G06F 1/1616 | |

\* cited by examiner

HINGED KEYBOARD ACCESSORY HAVING MULTIPLE INSTALLATION MODES FOR A TABLET COMPUTING DEVICE

FIELD

Embodiments relate generally to accessory devices for electronic devices. More particularly, the described embodiments relate to an accessory device for a tablet computing device, the accessory device having multiple installation modes.

BACKGROUND

Tablet computing devices are becoming ever more powerful and useful in a wide range of activities. In some situations, it is desirable to use a keyboard or other auxiliary input device in addition to build-in input devices of a tablet computing device. Many traditional auxiliary input devices are difficult to use and undermine the advantages provided by a tablet computing device.

SUMMARY

Embodiments of the systems, devices, methods, and apparatuses described in the present disclosure are directed to an accessory device for a tablet computing device having multiple installation modes.

One embodiment may take the form of an accessory device for a tablet computing device that includes a base portion and a coupling mechanism. The base portion may include a keyboard having a set of electromechanical keys. The coupling mechanism may be positioned along a side of the keyboard and may be configured to rotatably couple the base portion to the tablet computing device having a touchscreen display. The coupling mechanism may be configured to retain the tablet computing device in a first orientation in a first installation mode and a second orientation in a second installation mode. The coupling mechanism may include a first body section rotatably coupled to the base portion and a second body section extending from the first body section configured to cover a portion of a rear exterior surface of the tablet computing device in the first installation mode and cover a portion of a front exterior surface of the tablet computing device corresponding to a portion of the touchscreen display in the second installation mode. The coupling mechanism may further include an auxiliary display coupled to the second body section and configured to provide a graphical output.

Another embodiment may take the form of a system that includes a tablet computing device, a stylus, and an accessory device. The tablet computing device may include a touchscreen display configured to provide a graphical output that is viewable along a first exterior surface of the tablet computing device. The tablet computing device may further include a magnetic element. The stylus may be configured to provide an input at the touchscreen display and may be configured to magnetically couple to the magnetic element of the tablet computing device. The accessory device may include a base portion including a keyboard and a coupling mechanism configured to rotatably couple the base portion to the tablet computing device. The coupling mechanism may define a first surface configured to partially cover the first exterior surface of the tablet computing device in a first installation mode and partially cover a second exterior surface of the tablet computing device opposite the first exterior surface in a second installation mode. The coupling mechanism may further define a second surface opposite the first surface. The second surface may define a recess that is configured to receive the stylus and align the stylus with the magnetic element.

Another embodiment may take the form of a system that includes a tablet computing device, an accessory device, and a processing unit. The tablet computing device may include a device housing defining a front exterior surface of the tablet computing device and a rear exterior surface of the tablet computing device opposite the front exterior surface. The tablet computing device may further include a touchscreen display configured to provide a graphical output at a display region defined along the front exterior surface of the tablet computing device. The accessory device may include a base portion that includes a keyboard and a coupling mechanism that is configured to rotatably couple the tablet computing device to the base portion. The coupling mechanism may include a body section configured to partially cover the rear exterior surface of the tablet computing device in a first installation mode and cover a first portion of the display region in a second installation mode. The processing unit may be operably coupled to the touchscreen display and may be configured to detect that the tablet computing device is installed in the second installation mode in which the coupling mechanism covers the first portion of the display region. In response to detecting that the tablet computing device is installed in the second installation mode, the processing unit may be configured to modify the graphical output to display a user interface element at a second portion of the display region that is not covered by the coupling mechanism.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
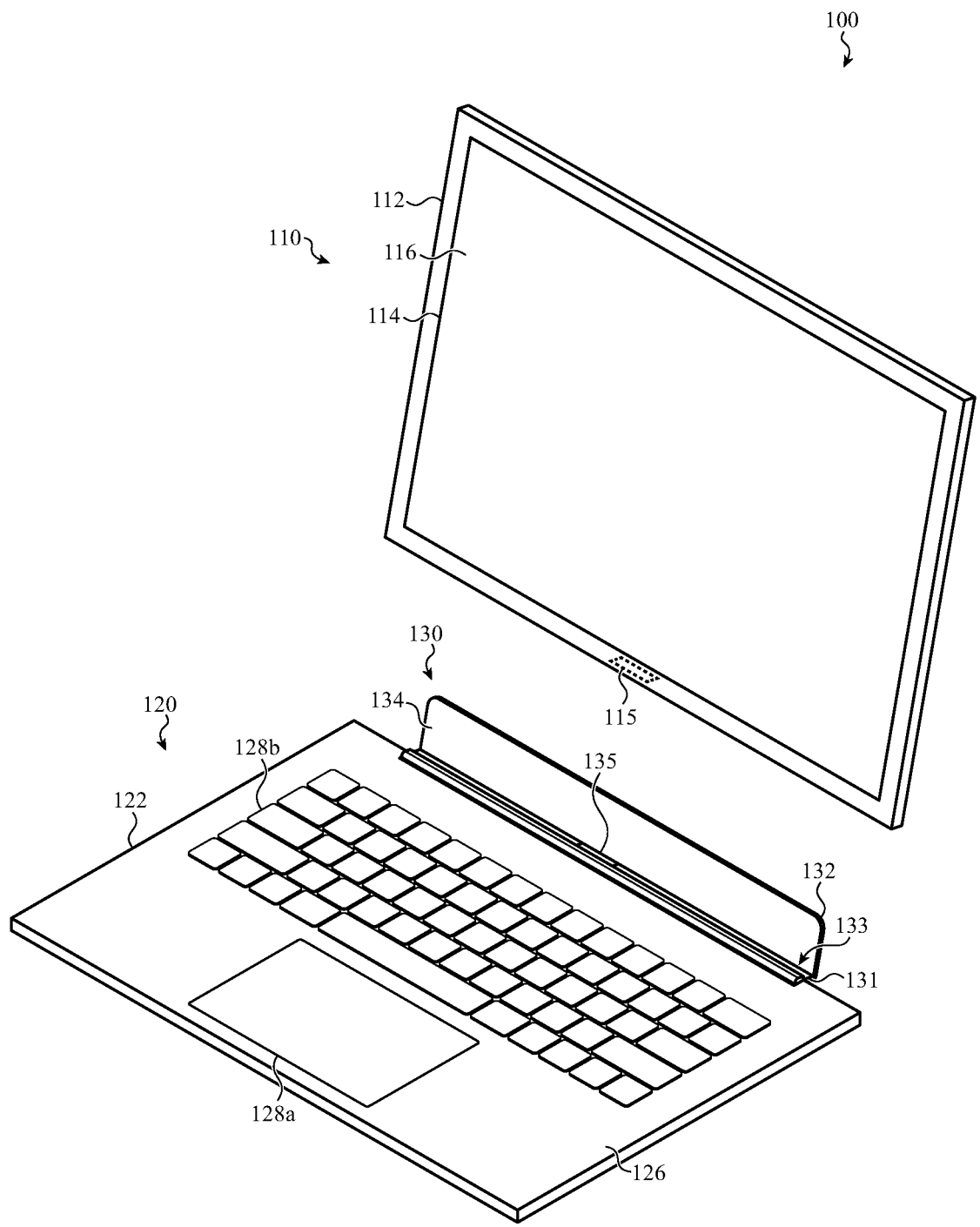
FIGS. 1A-1F show a system that includes a tablet computing device and an accessory device that are capable of being releasably coupled together in multiple installation modes.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to embodiments of an accessory device that may be used with tablet computing devices and other portable electronic devices. The accessory device described herein may include a base portion having one or more input devices (e.g., keyboards, trackpads, touchscreen displays, and the like) for providing inputs to a tablet computing device.

The accessory device may include a coupling mechanism for releasably coupling the base portion of the accessory device to a tablet computing device in multiple different installation modes. The coupling mechanism may define an attachment interface for retaining the tablet computing device to the base portion. The attachment interface may be at least partially defined by a body section of the coupling mechanism.

In a first installation mode, the body section of the coupling mechanism may extend along a rear exterior surface of the tablet computing device that is opposite a touchscreen display of the tablet computing device. In the first installation mode, the body section of the coupling mechanism may cover a portion of (e.g., partially cover) the rear exterior surface. In a second installation mode, the body section of the coupling mechanism may cover a portion of the touchscreen display of the tablet computing device. In the second installation mode, the body section may cover a portion of (e.g., partially cover) the front exterior surface of the tablet computing device that corresponds to the covered portion of the touchscreen display. In cases in which the coupling mechanism covers a portion of a touchscreen display of the tablet computing device, (e.g., in the second installation mode), a graphical output provided by the touchscreen display may be altered in response to the portion of touchscreen display being covered by the coupling mechanism. As an example, one or more user interface elements may be moved from the covered portion of the touchscreen display to another portion of the touchscreen display that is not covered by the coupling mechanism.

The coupling mechanism may include an auxiliary display for providing a graphical output in addition to the graphical output provided by the touchscreen display of the tablet computing device. The auxiliary display may provide a graphical output along a surface of the body section opposite a surface that extends along the tablet computing device. The graphical output of the auxiliary display may provide information regarding an operational state of the tablet computing device. For example, the graphical output of the auxiliary display may correspond to a battery level of the tablet computing device, a user account of the tablet computing device, alerts provided by the tablet computing device, and the like. In cases in which the coupling mechanism covers a portion of a touchscreen display of the tablet computing device (e.g., the second installation mode), the graphical output provided by the auxiliary display may include one or more user interface elements that are provided on the touchscreen display when the coupling mechanism is not covering the touchscreen display (e.g., in the second installation mode).

The coupling mechanism may define a recess for receiving a stylus that may be used to provide inputs to the tablet computing device. The stylus may be capable of being magnetically coupled to the tablet computing device. In the first installation mode and/or the second installation mode, the coupling mechanism may be positioned relative to a magnetic element of the tablet computing device such that the recess aligns the stylus with the magnetic element to facilitate the magnetic coupling. The stylus may additionally or alternatively be wirelessly charged by the tablet computing device. The coupling mechanism may be positioned relative to a wireless charging coil of the tablet computing device such that the recess aligns the stylus with the wireless charging coil to facilitate the wireless charging.

The recess for receiving the stylus may be a hole that extends all the way through the body section of the coupling mechanism. In cases in which the coupling mechanism covers a portion of a touchscreen display of the tablet computing device (e.g., the second installation mode), a display region of the touchscreen display may be viewable through the hole. When the stylus is absent from the recess, one or more user interface elements (e.g., user interface elements relating to functions of the stylus), may be displayed in the display region. When the stylus is positioned in the recess, the user interface elements may be displayed elsewhere on the touchscreen display or not displayed at all.

The coupling mechanism may rotatably couple the accessory device to a tablet computing device so that the devices can move relative to one another. The rotatable coupling provided by the coupling mechanism allows the system to transition between one or more unfolded configurations and a folded configuration. In a folded configuration of the system, the touchscreen display of the tablet may face towards the keyboard in the first installation mode so that the touchscreen display is covered by the accessory device and protected from damage. In the folded configuration, the touchscreen display of the tablet computing device may face away from the keyboard in the second installation mode so that the touchscreen is accessible to the user for use in the folded configuration.

As noted above, the coupling mechanism may define an attachment interface for retaining the tablet computing device to the base portion of the accessory device. The attachment interface may include a retention channel that is configured to receive the tablet computing device. The retention channel may include one or more walls defined by one or more body sections of the coupling mechanism. In some cases, one or more walls of the retention channel are capable of retracting to facilitate installation and/or removal of the tablet computing device. The wall(s) may extend once the tablet computing device is installed to retain the tablet computing device to the accessory device. The coupling mechanism may include an electrical connector positioned within the retention channel that operably couples the accessory device to the tablet computing device when the tablet computing device is installed in the retention channel.

Additionally or alternatively, the coupling mechanism may include one or more magnetic elements that at least partially define the attachment interface. The tablet computing device may include one or more magnetic elements that are configured to align with the magnetic element(s) of the coupling mechanism to couple the tablet computing device to the accessory device. In various embodiments, one or more magnetic elements of the coupling mechanism may be controlled to improve the installation and/or removal processes of the tablet computing device. For example, a magnetic flux of one or more magnetic elements may be reduced such that the magnetic force between the tablet computing device and the coupling mechanism is reduced. Additionally or alternatively, a polarity of one or more magnetic elements may be changed. This may allow for a smoother installation process by avoiding the tablet computing device and the coupling mechanism snapping together from a distance that results in an undesirable user experience. Similarly, this may improve a user experience by making removal of the tablet computing device easier.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are, directly or indirectly, physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled" may be used to refer to two or more devices that are coupled in any suitable manner for operation and/or communication, including wiredly, wirelessly, or some combination thereof. As used herein, the term "rotatably coupled" may refer to any direct or indirect attachment of two or more elements, structures, objects, components, parts or the like that allows the elements, structures, objects, components, parts or the like to rotate relative to one another. As used herein, "releasably coupled" may refer to any direct or indirect attachment of two or more elements, structures, objects, components, parts or the like that allows the elements, structures, objects, components, parts or the like to be decoupled or separated from one another. In some cases, elements, structures, objects, components, parts or the like that are releasably coupled may be repeatedly coupled and decoupled from one another without damaging or altering the elements, structures, objects, components, parts, or any mechanisms used to couple the elements, structures, objects, components, parts or the like These and other embodiments are discussed with reference to FIGS. 1A-11. However, those skilled in the art will readily appreciate that the detailed description given herein with respect to these figures is for explanatory purposes only and should not be construed as limiting.

FIGS. 1A-1F show a system 100 that includes a tablet computing device 110 and an accessory device 120 that are capable of being releasably coupled together in multiple installation modes. The accessory device 120 includes a base portion 122 and a coupling mechanism 130. The coupling mechanism 130 is capable of releasably coupling the tablet computing device 110 to the base portion 122 of the accessory device 120.

FIG. 1A shows the tablet computing device 110 and the accessory device 120 in an uncoupled state. The coupling mechanism 130 may include a first body section 131 that is rotatably coupled to the base portion 122, and a second body section 132 that extends from the first body section. The coupling mechanism 130 may define an attachment interface for retaining the tablet computing device to the base portion 122. The second body section 132 may at least partially define the attachment interface. The attachment interface may be any combination of structural features (e.g., walls, retention channels, and the like), retaining mechanisms (e.g., magnets, latches, and the like) that are suitable for retaining the tablet computing device to the base portion 122.

The second body section 132 may additionally define a first surface 134 that extends along and covers a portion of an exterior surface of the tablet computing device 110 when the tablet computing device 110 is retained to the base portion 122 by the attachment interface. The attachment interface may include a retention channel 133 that is defined by the coupling mechanism 130 for receiving the tablet computing device 110. The first body section 131 may define a first wall of the retention channel 133, and the second body section 132 may define a second wall of the retention channel. A portion of the tablet computing device 110 may be positioned between the first wall and the second wall.

The coupling mechanism 130 may include an electrical connector 135 configured to operably couple the accessory device 120 to the tablet computing device 110. The electrical connector 135 may be positioned within the retention channel 133 of the coupling mechanism. The tablet computing device 110 may have a corresponding electrical connector 115 such that when the tablet computing device is installed in the retention channel 133, a connection is made that operably couples the accessory device 120 and the tablet computing device 110. The electrical connectors 115, 135 may include contact pads, pins, or other types of connection mechanisms. In some cases, the accessory device 120 to the tablet computing device 110 are operably coupled via a wireless connection (e.g., Bluetooth, WiFi, or other wireless protocols).

The accessory device 120 may include one or more input devices for providing inputs to the tablet computing device 110. The input devices may include a trackpad 128a or other touch-sensitive surface, a keyboard 128b, a touchscreen display, buttons, dials, and the like. One or more input devices may be positioned along a top surface 126. The trackpad 128a may include a touch sensor that is configured to control a cursor or other graphical element of the tablet. The keyboard 128b may include a set of electromechanical keys and/or one or more virtual keys provided on a touch-screen display. The coupling mechanism 130 may be positioned along a side of the keyboard 128b and/or the trackpad 128a.

The term "tablet computing device" may be used to refer to a portable electronic device in which a display defines a substantial entirety of the front surface of the device. The tablet computing device may define a border or bezel region that surrounds the display region and may include one or more buttons or input devices located along the border region or bezel and/or along the sides of the device. In some cases, tablet computing devices do not include integrated keyboards. The primary modes of input for many tablet computing devices may be touch and/or force inputs provided over the display region.

The tablet computing device 110 may include a housing 112 that defines a front exterior surface 116 (FIGS. 1A and 1B) and a rear exterior surface 118 (FIG. 1C) opposite the front exterior surface. The tablet computing device 110 may further include a touchscreen display 114 that provides a graphical output that is viewable at the front exterior surface 116. The touchscreen display 114 may be capable of receiving touch inputs at the front exterior surface 116. The housing 112 may include a cover sheet positioned over the touchscreen display 114 that forms at least a portion of the front exterior surface 116.

The touchscreen display 114 may be capable of providing graphical outputs and receiving touch inputs through the cover sheet. The touchscreen display 114 may include a display portion that can be implemented with any suitable technology, including, but not limited to liquid crystal display (LCD) technology, light emitting diode (LED) technology, organic light-emitting display (OLED) technology, organic electroluminescence (OEL) technology, electronic paper (e.g., electronic ink) display technology, or another type of display technology. In some embodiments, the touchscreen display 114 includes one or more sensors (e.g., capacitive touch sensors, ultrasonic sensors, or other touch sensors) positioned above, below, or integrated with the display portion. In various embodiments, a graphical output of the touchscreen display 114 is responsive to inputs provided to the tablet computing device 110 and/or the accessory device 120. The tablet computing device 110 may include additional components typical of computing devices that are not shown in FIGS. 1A-1F, including a processing unit, memory, input devices, output devices, and the like.

Figure 1B:
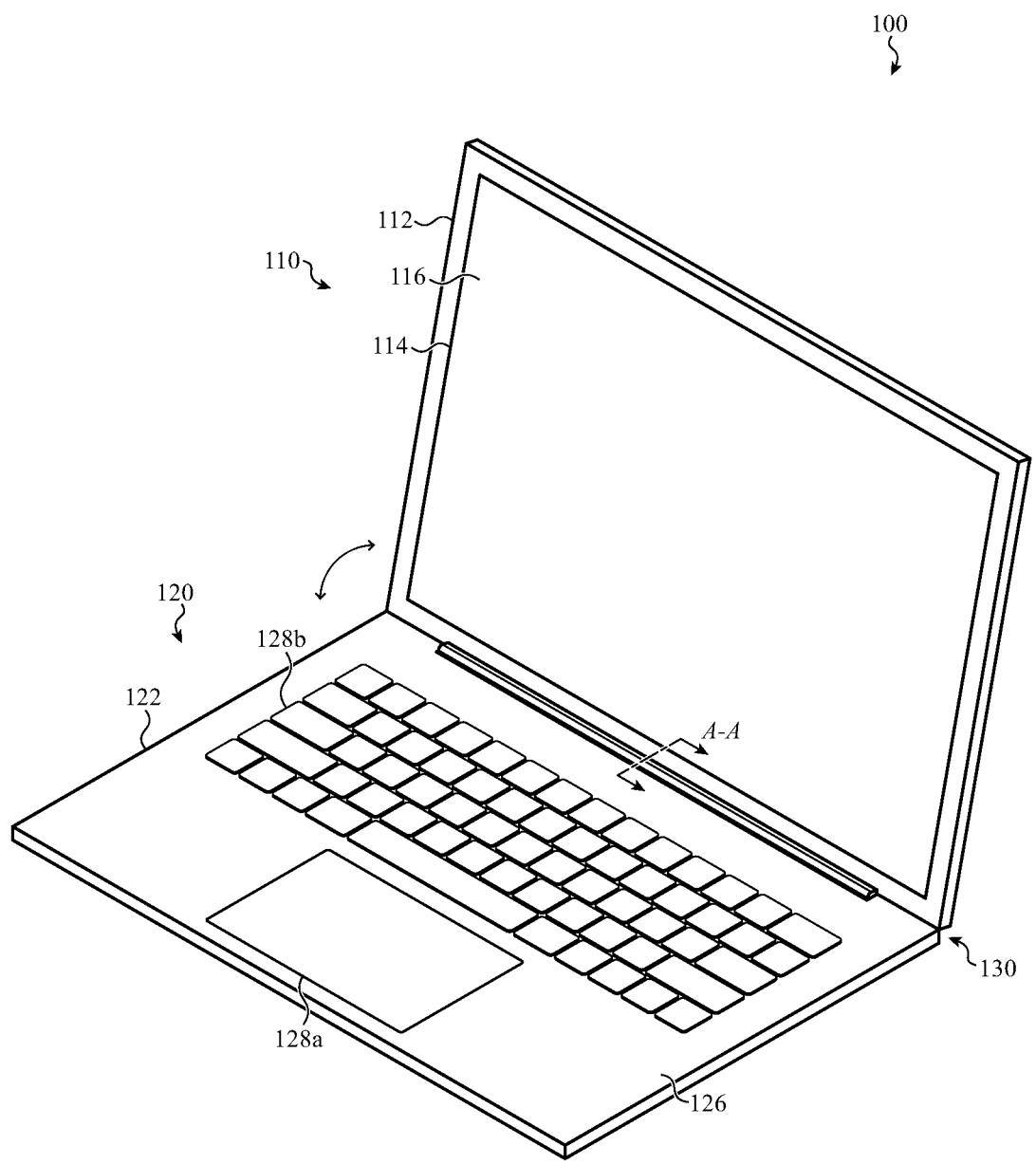
Figure 1C:
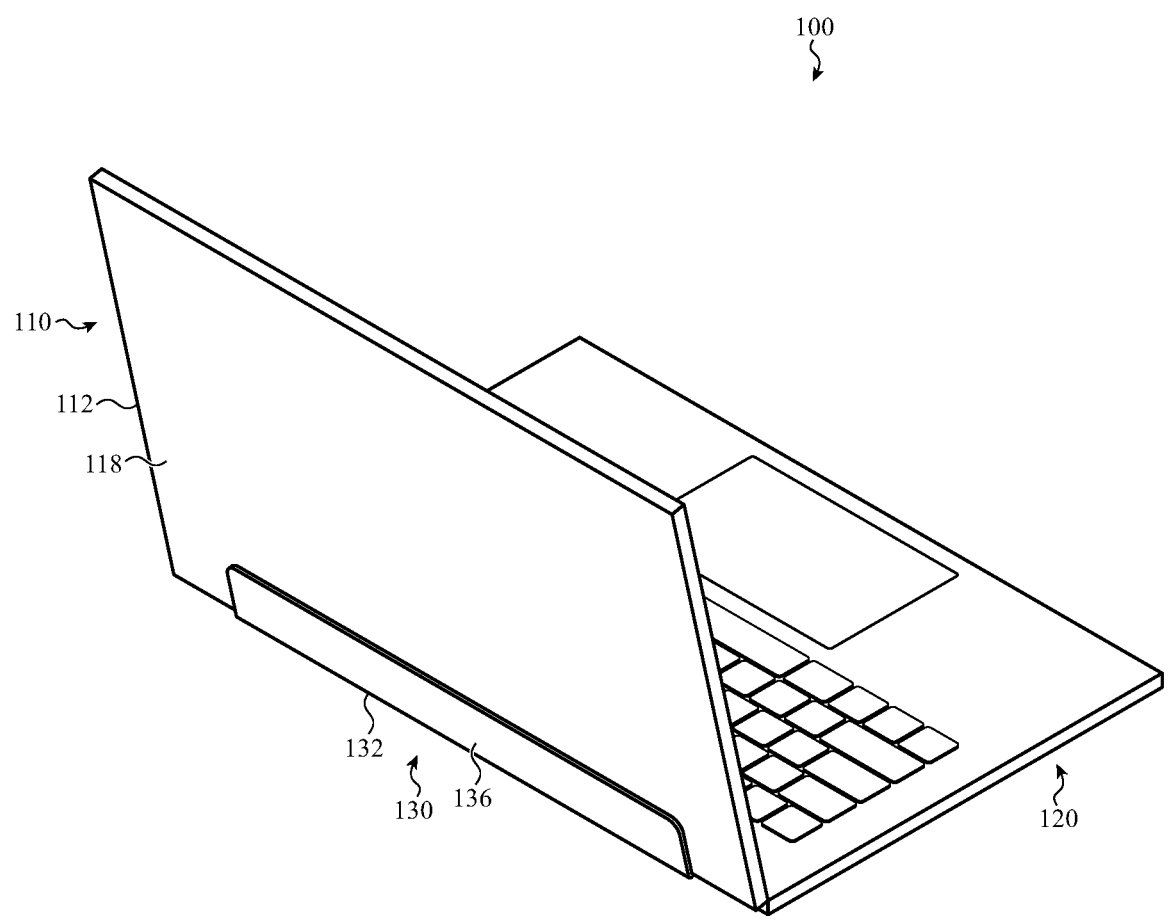
Figure 1D:
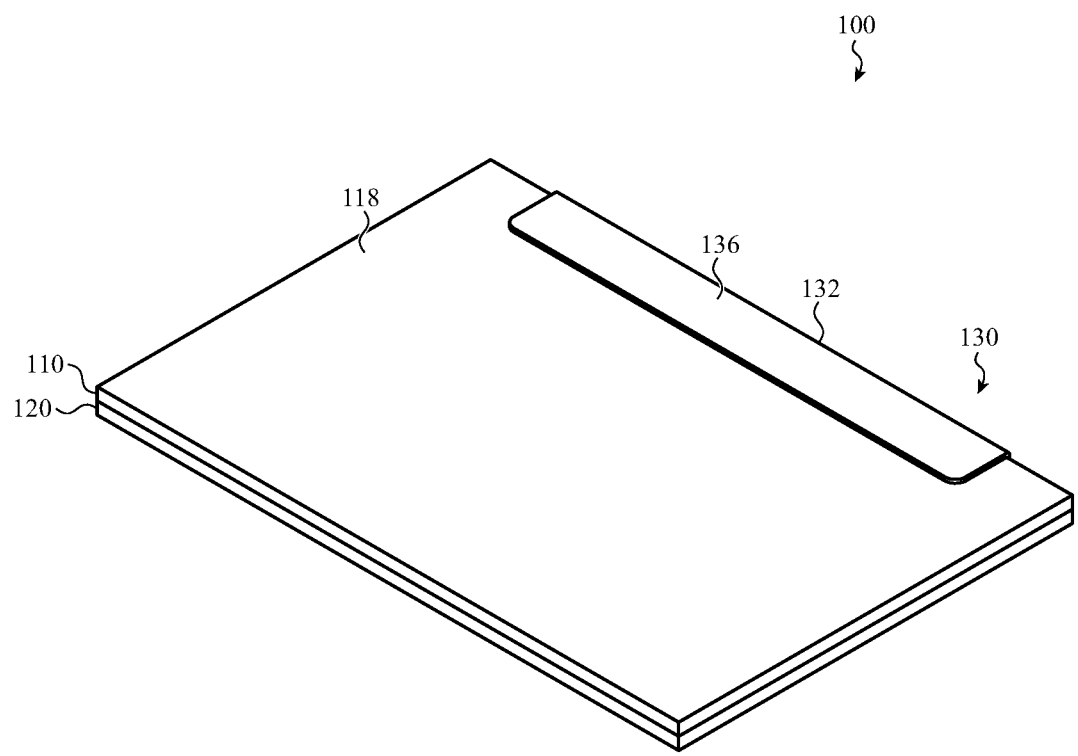
Figure 1E:
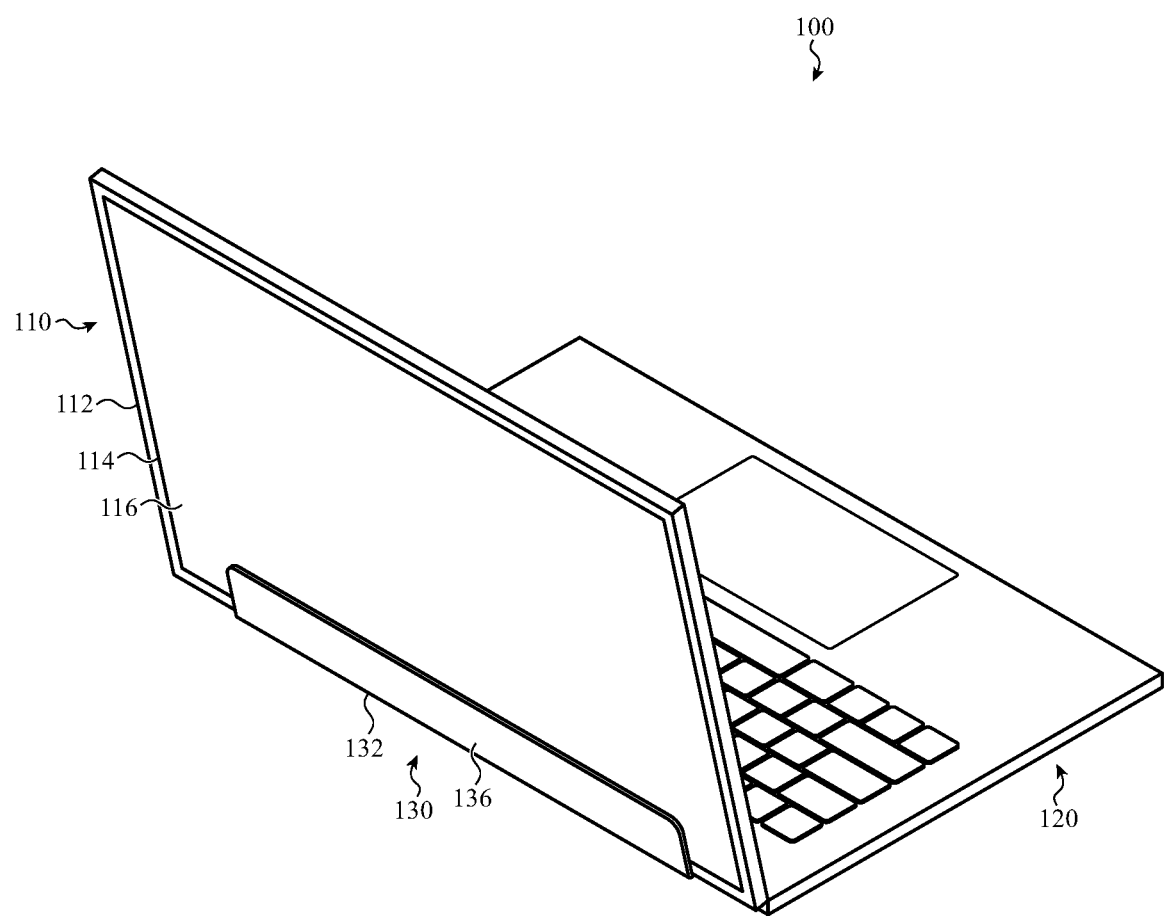
Figure 1F:
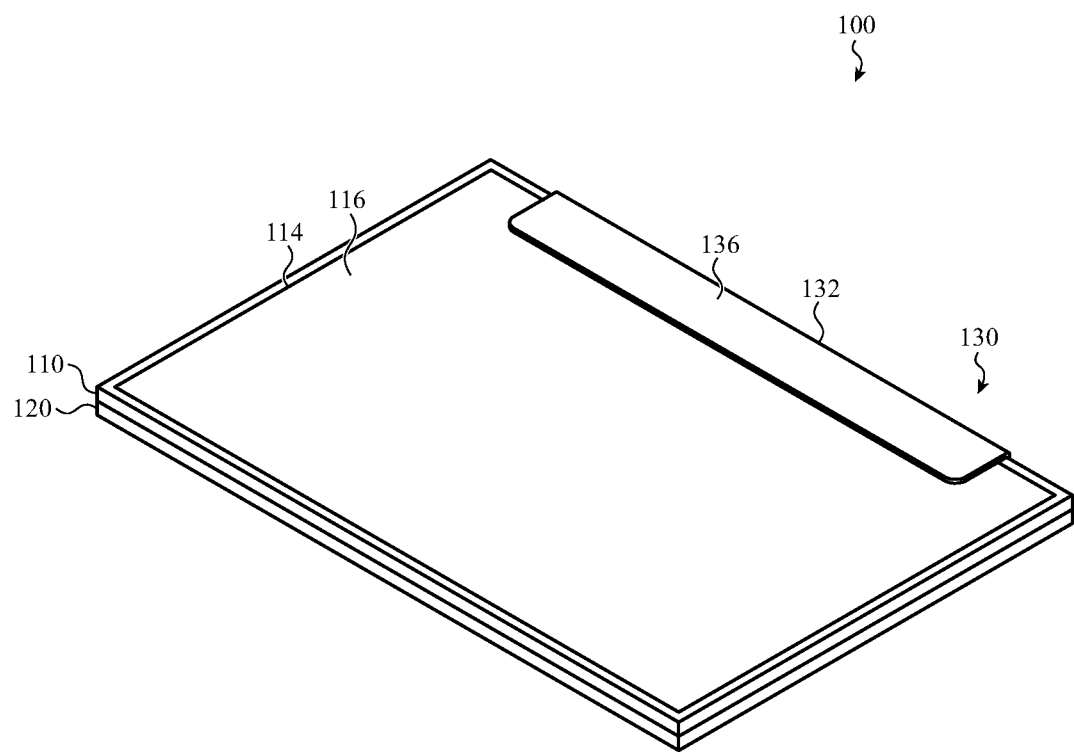

As noted above, the tablet computing device 110 and the accessory device 120 are capable of being releasably coupled together in multiple installation modes. FIGS. 1B-1D show the tablet computing device 110 rotatably coupled to the accessory device 120 by the coupling mechanism 130 in a first installation mode. FIGS. 1E and 1F show the tablet computing device 110 rotatably coupled to the accessory device 120 by the coupling mechanism 130 in a second installation mode.

In the first installation mode, the tablet computing device 110 is retained in a first orientation with respect to the coupling mechanism 130. As shown in FIG. 1B, in the first installation mode, the trackpad 128a and the keyboard 128b of the accessory device 120 and the touchscreen display 114 of the tablet computing device 110 may be generally facing towards a user and accessible to a user at the same time. The first installation mode may allow the system 100 to be used similarly to a laptop computer.

Turning to FIG. 1C, in the first installation mode, the second body section 132 of the coupling mechanism 130 may extend along the rear exterior surface 118 of the tablet computing device 110. The surface 134 of the second body section 132 may extend along the rear exterior surface 118. In the first installation mode, the second body section 132 of the coupling mechanism 130 may cover a portion of the rear exterior surface 118. The second body section 132 may define a surface 136 opposite the surface 134 and facing away from the tablet computing device 110. The coupling mechanism 130 may include an auxiliary display that provides a graphical output along the surface 136 of the second body section 132, as discussed in more detail below with respect to FIGS. 3A-3B. Additionally or alternatively, the surface 136 may define a recess configured to receive a stylus, as discussed in more detail below with respect to FIGS. 4A-4C.

As indicated by the arrows in FIG. 1B, the tablet computing device 110 and the accessory device 120 are capable of moving relative to one another when rotatably coupled. The coupling mechanism 130 may define a hinge mechanism that facilitates this relative motion. For example, the coupling mechanism 130 may be capable of pivoting or rotating relative to the base portion 122 of the accessory device 120. The tablet computing device 110 may be coupled to the coupling mechanism 130 such that the tablet computing device 110 and the coupling mechanism 130 pivot or rotate together relative to the base portion 122 of the accessory device 120. The hinge mechanism defined by the coupling mechanism 130 may include a clutch or frictional element that holds the coupling mechanism in one of a range of positions. The hinge mechanism may include one or more detents or other catch mechanisms at particular positions of the coupling mechanism 130. For example, the hinge mechanism may include a detent or catch mechanism at a position that results in a 110 degree angle between the touchscreen display 114 of the tablet computing device 110 and the top surface 126 of the accessory device 120 and/or a surface upon which the accessory device 120 is placed.

FIG. 1D shows the system 100 in a folded configuration in the first installation mode. The rotatable coupling provided by the coupling mechanism 130 allows the system 100 to transition between one or more unfolded configurations (e.g., as shown in FIGS. 1B and 1C) to the folded configuration shown in FIG. 1D. In the folded configuration in the first installation mode, the top surface 126 of the accessory device 120 and the front exterior surface 116 of the tablet computing device 110 face inwards towards one another. As such, the touchscreen display 114 faces the trackpad 128a and the keyboard 128b. This may protect the touchscreen display 114, the trackpad 128a, and/or the keyboard 128b from damage or accidental manipulation.

As noted above, FIGS. 1E and 1F show the tablet computing device 110 rotatably coupled to the accessory device 120 by the coupling mechanism 130 in a second installation mode. In the second installation mode, the tablet computing device 110 is retained in a second orientation, different from the first orientation, relative to the coupling mechanism 130. As shown in FIG. 1E, the second body section 132 of the coupling mechanism 130 may extend along the front exterior surface 116 of the tablet computing device 110. The surface 134 of the second body section 132 may extend along the front exterior surface 116. In the second installation mode, the second body section 132 may cover a portion of the front exterior surface 116 that corresponds to a portion of the touchscreen display 114.

FIG. 1F shows the system 100 in a folded configuration in the second installation mode. In the folded configuration in the second installation mode, the top surface 126 of the accessory device 120 and the rear exterior surface 118 of the tablet computing device 110 face inwards towards one another. As such, the touchscreen display 114 faces away from the trackpad 128a and the keyboard 128b. This allows the touchscreen display 114 to be viewable and accessible when the system 100 is in the folded configuration. As such, a user may be able to view graphical outputs provided by the touchscreen display 114 and provide inputs to the touchscreen display while the system 100 is in the folded configuration.

As shown in FIGS. 1D and 1E, in the second installation mode, the second body section 132 of the coupling mechanism 130 may cover a portion of the touchscreen display 114. In various embodiments, a graphical output of the touchscreen display 114 may be altered in response to the portion of touchscreen display being covered by the coupling mechanism 130.

Figure 2A:
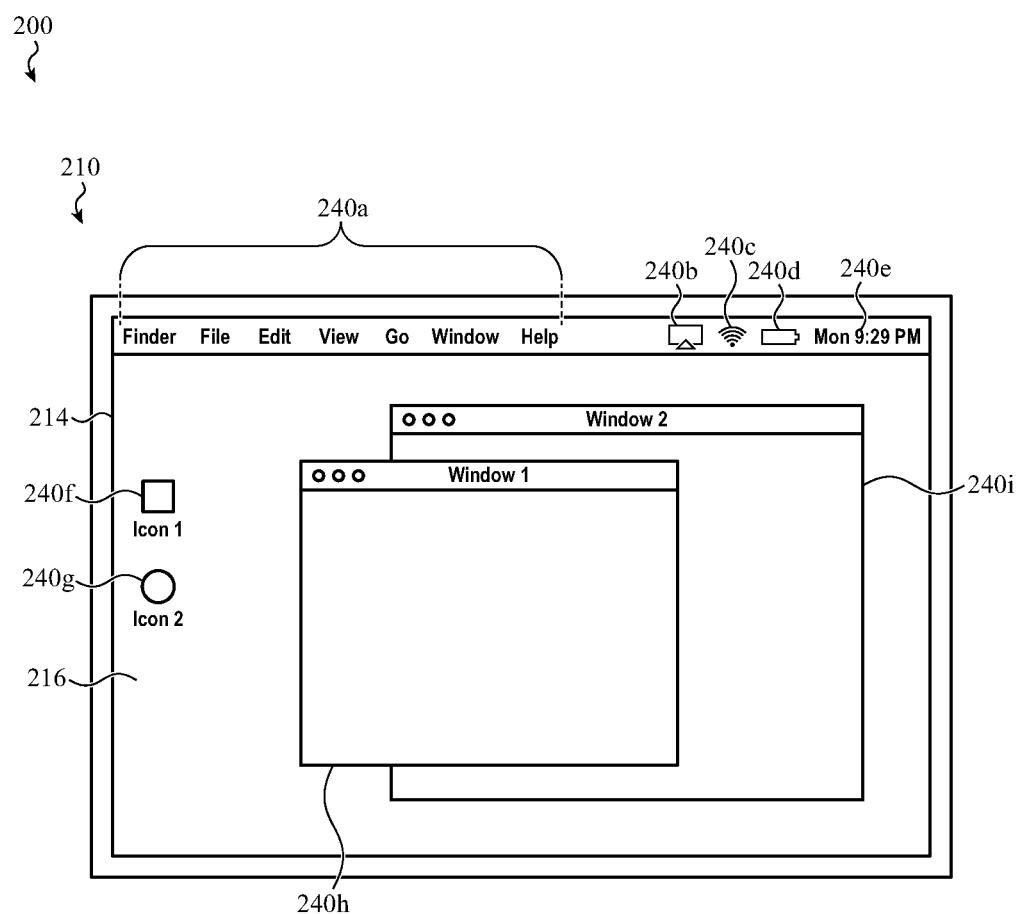
FIGS. 2A and 2B show an example graphical output provided by a touchscreen display of a tablet computing device that changes in response to a portion of the touchscreen display being covered by a body section of a coupling mechanism of an accessory device.
Figure 2B:
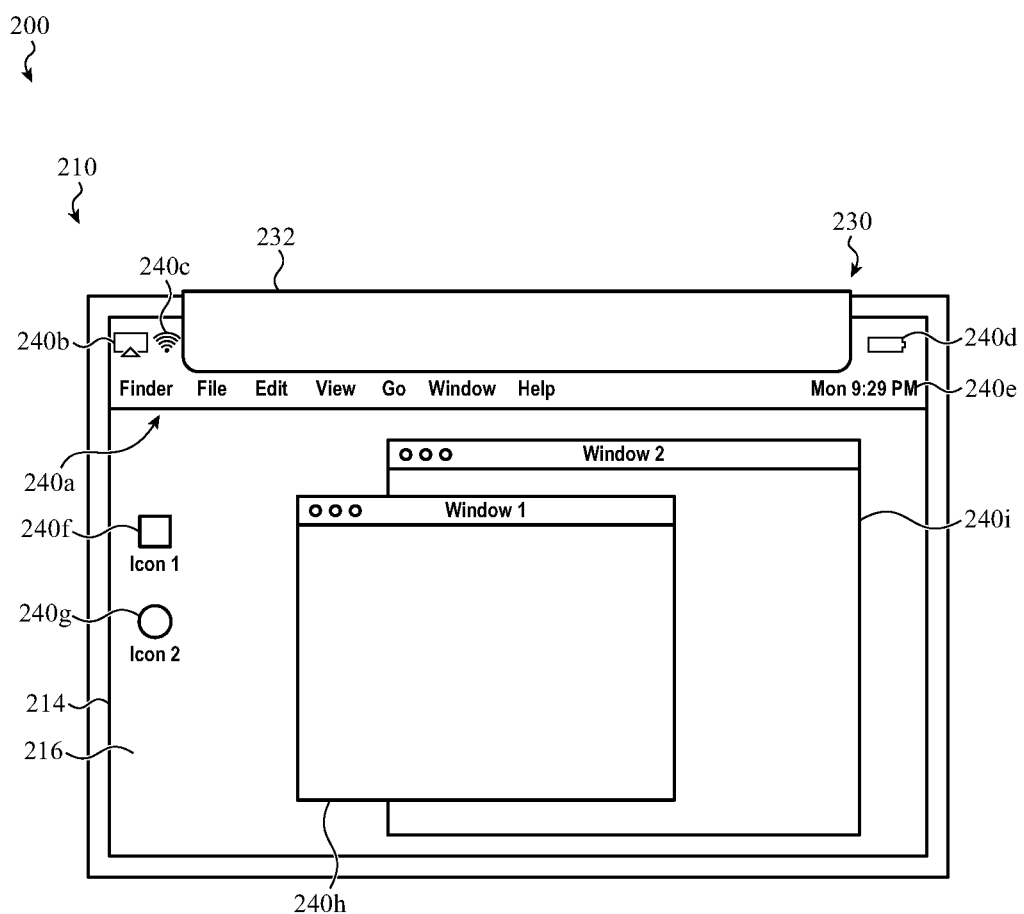

FIGS. 2A and 2B show an example graphical output provided by a touchscreen display 214 of a tablet computing device 210 that changes in response to a portion of the touchscreen display being covered by a second body section 232 of a coupling mechanism 230 of an accessory device. The tablet computing device 210 and the coupling mechanism 230 may be parts of a system 200 that has the same or similar structure and/or functionality as the systems described herein (e.g., system 100).

FIG. 2A shows the tablet computing device 210 in a state in which the coupling mechanism 230 is not covering any portion of the touchscreen display 214. Similar to the touchscreen display 114 described with respect to FIGS. 1A-1E, the touchscreen display 214 may provide a graphical output along a front exterior surface 216 of the tablet computing device 210. The state shown in FIG. 2A may be a first installation mode in which the coupling mechanism 230 extends along and covers a portion of a rear exterior surface of the tablet computing device 210. The state shown in FIG. 2A may also be an uncoupled state in which the tablet computing device 210 is not coupled to an accessory device.

The graphical output provided by the touchscreen display 214 of the tablet computing device 210 may include one or more graphical elements (e.g., user interface elements 240a-i) of a graphical user interface provided by the tablet computing device. The user interface elements may include menu elements 240a, icons 240b-240d, time and date elements 240e, icons 240f, 240g, application windows 240h, 240i, and the like. The graphical output of the touchscreen display may be responsive to (e.g., may change in response to) inputs received by the tablet computing device 210 (e.g., touch inputs received at the touchscreen display 214). The graphical output of the touchscreen display 214 may be responsive to inputs received at an accessory device (e.g., an accessory device 120 coupled to the tablet computing device 210), including inputs received by a keyboard or trackpad of an accessory device.

The user interface elements 240a-i are example graphical elements that may be provided as part of a graphical output on the touchscreen display 214, and are not meant to be limiting. The graphical output provided on the touchscreen display 214 may consist of any combination of graphical elements, animations, transitions, and the like.

FIG. 2B shows the tablet computing device 210 in a state in which the coupling mechanism 230 covers a portion of the touchscreen display 214. The state shown in FIG. 2B may be the second installation mode described above with respect to FIGS. 1E and 1F. The tablet computing device 210 (e.g., a processing unit of the tablet computing device) may be capable of determining that it is in a state in which a portion of the touchscreen display 214 is covered. The processing unit of the tablet computing device 210 may determine its orientation relative to the coupling mechanism to determine whether it is in a first installation mode, a second installation mode, or an uncoupled state. The processing unit may determine the orientation of the tablet computing device 210 based on a connection between an electrical connector of the tablet computing device (e.g., electrical connector 115 discussed with respect to FIG. 1A) and an electrical connector of the accessory device (e.g., electrical connector 135 discussed with respect to FIG. 1A). Additionally or alternatively, the tablet computing device 210 and/or the coupling mechanism 230 may include one or more proximity sensors that may be used by the processing unit to determine the orientation of the tablet computing device.

In response to determining that the tablet computing device 210 is in a state (e.g., the second installation mode), in which the coupling mechanism 230 covers a portion of the touchscreen display 214, the processing unit may cause the touchscreen display 214 to alter the graphical output. As shown in FIG. 2B, altering the graphical output may include moving one or more user interface elements 240a-i to different locations. Moving a user interface element may include removing a user interface element from one location on the touchscreen display 214 and displaying the user interface element at a different location on the touchscreen display. In some cases, the user interface elements 240a-e that are at least partially displayed in the covered portion in the first installation mode are moved to a portion of the touchscreen display that is visible in the second installation mode so that the user interface elements are visible in the second installation mode. For example, in FIG. 2A, menu elements 240a, the icons 240b-d, and the date and time elements 240e are at least partially displayed in the portion of the touchscreen display 214 that is covered by the coupling mechanism 230 in FIG. 2B. In FIG. 2B, menu elements 240a, the icons 240b-d, and the date and time elements 240e are displayed in a remaining portion of the touchscreen display 214 that is not covered by the coupling mechanism 230. At least some of the user interface elements 240a-e may form at least a portion of a menu bar, home bar, or status bar of the graphical user interface.

Figure 3A:
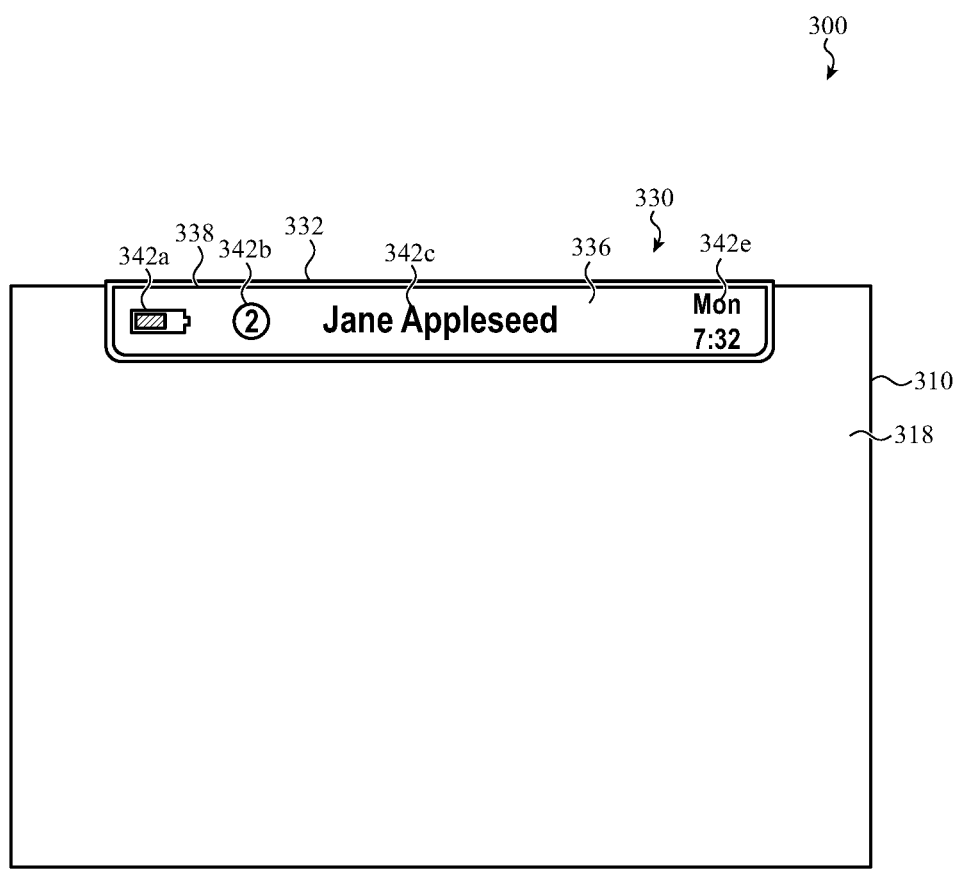
FIGS. 3A and 3B show a tablet computing device that is coupled to an accessory device by a coupling mechanism that includes an auxiliary display.
Figure 3B:
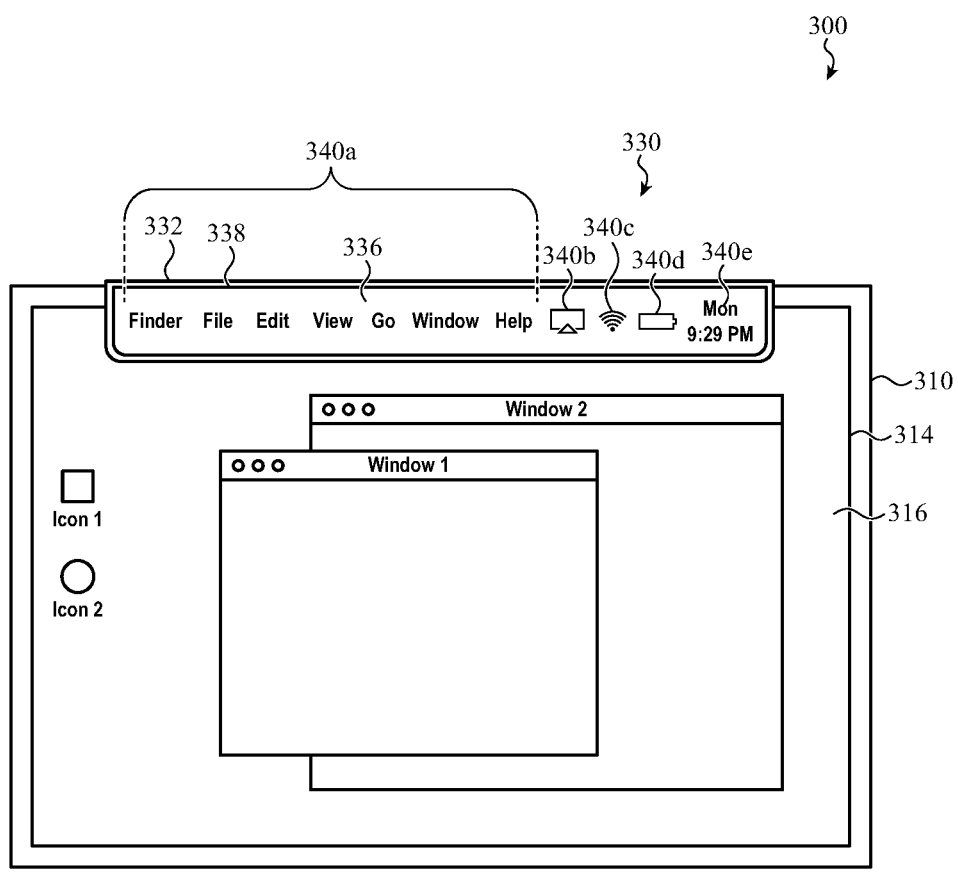

In some cases, the coupling mechanisms described herein may include an auxiliary display for providing a graphical output in addition to the graphical output provided by the touchscreen display of the tablet computing device. FIGS. 3A and 3B show a tablet computing device 310 that is coupled to an accessory device by a coupling mechanism 330 that includes an auxiliary display 338. The tablet computing device 310 and the coupling mechanism 330 may be parts of a system 300 that has the same or similar structure and/or functionality as the systems described herein (e.g., systems 100 and 200).

FIG. 3A shows the system 300 in a first installation mode similar to the first installation mode described above with respect to FIGS. 1A-1D. In the first installation mode, a second body section 332 of the coupling mechanism 330 extends along and covers a portion of a rear exterior surface 318 of the tablet computing device 310. FIG. 3B shows the system 300 in a second installation mode similar to the second installation mode described above with respect to FIGS. 1E-2B. In the second installation mode, the second body section 332 of the coupling mechanism extends along a front exterior surface 316 of the tablet computing device 310 and covers a portion of a touchscreen display 314 of the tablet computing device.

The coupling mechanism 330 defines a second surface 336 opposite a first surface that extends along and covers a portion of the tablet computing device 310. The auxiliary display 338 is coupled to the second body section 332 and provides a graphical output along the second surface 336. A processing unit of the tablet computing device 310 may be capable of controlling the graphical output of the auxiliary display 338. The auxiliary display 338 may be configured as a touchscreen display, and the tablet computing device 310 may be capable of receiving touch inputs at the auxiliary display.

In the first installation mode shown in FIG. 3A, the graphical output of the auxiliary display 338 may include user interface elements 342a-e that provide information regarding an operational state of the tablet computing device 310. For example, a user interface element 342a may show a battery level of the tablet computing device 310, a user interface element 342b may show alerts or notifications (and/or a number of alerts or notifications) of the tablet computing device 310, a user interface element 342c may display a name (e.g., a name associated with a user account of the tablet computing device 310), and a user interface element 342e may show a day and time.

In the second installation mode shown in FIG. 3B, the graphical output of the auxiliary display 338 may include one or more user interface elements 340a-e, similar to the user interface elements 240a-e discussed above with respect to FIGS. 2A-2B. Absent a portion of the touchscreen display 314 being covered (e.g., in the first installation mode), the graphical output of the touchscreen display 314 may be similar to the graphical output of the touchscreen display 214 shown in FIG. 2A.

In response to the processing unit of the tablet computing device 310 determining that the tablet computing device is in a state (e.g., the second installation mode) in which the coupling mechanism 330 covers a portion of the touchscreen display 314, the processing unit may alter the graphical outputs provided by the touchscreen display 314 and the auxiliary display 338. Altering the graphical outputs may include moving one or more user interface elements 340a-e from the touchscreen display 314 to the auxiliary display 338. Moving a user interface element may include removing the user interface element from the touchscreen display 314 and displaying the user interface element on the auxiliary display 338. For example, the user interface elements 340a-e may be moved from the touchscreen display 314 to the auxiliary display 338, as shown in FIG. 3B. As noted above, the auxiliary display 338 may be configured as a touchscreen display, enabling users to provide touch inputs to the tablet computing device 310, for example by interacting with the user interface elements 340a-e.

The auxiliary display 338 can be implemented with any suitable technology, including, but not limited to liquid crystal display (LCD) technology, light emitting diode (LED) technology, organic light-emitting display (OLED) technology, organic electroluminescence (OEL) technology, electronic paper (e.g., electronic ink) display technology, or another type of display technology. The auxiliary display 338 may include one or more sensors (e.g., capacitive touch sensors, ultrasonic sensors, or other touch sensors) positioned above, below, or integrated with a display portion.

In some cases, the auxiliary display 338 is an electronic paper (e.g., electronic ink or e-ink) display. In some cases, as noted above, the graphical output provided by the auxiliary display 338 is persistent in that once the graphical output of the auxiliary display is set, the static graphical output may be maintained on the auxiliary display indefinitely while in a powerless state (e.g., without electricity and/or without consuming power from and internal power source, including a battery or an external power source).

Figure 4A:
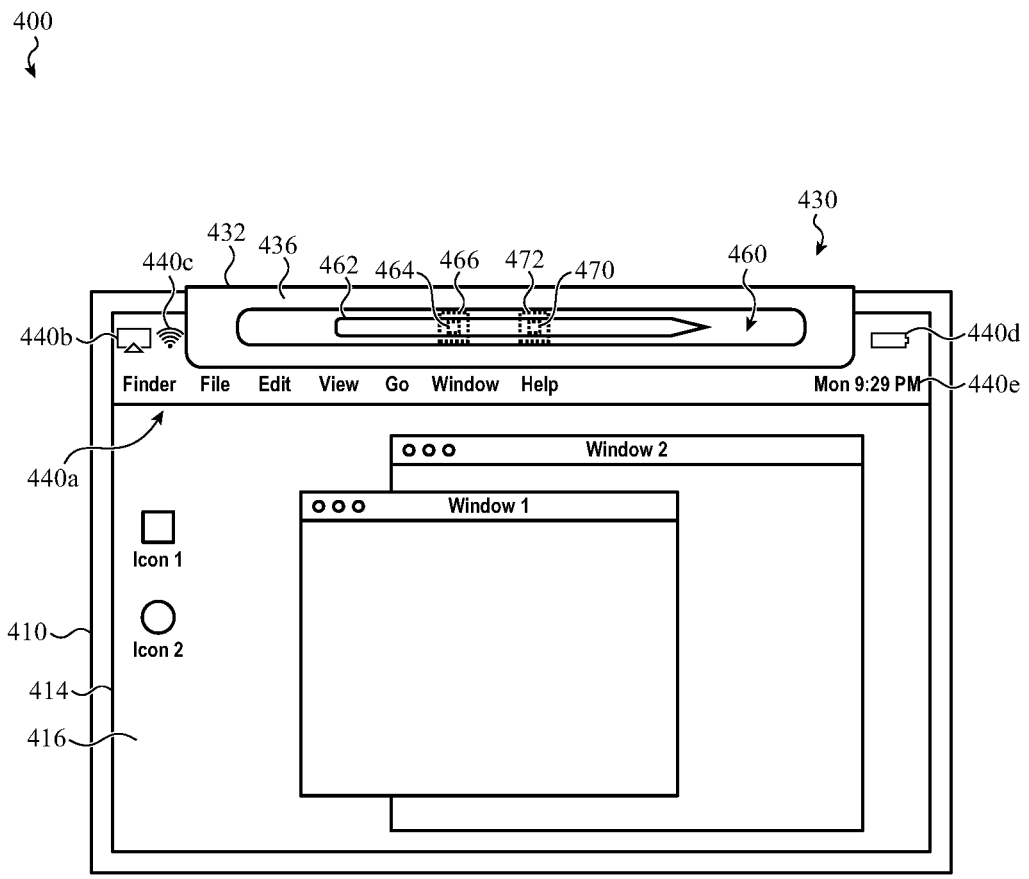
FIGS. 4A-4C show a tablet computing device that is coupled to an accessory device by a coupling mechanism that defines a recess for receiving a stylus.
Figure 4B:
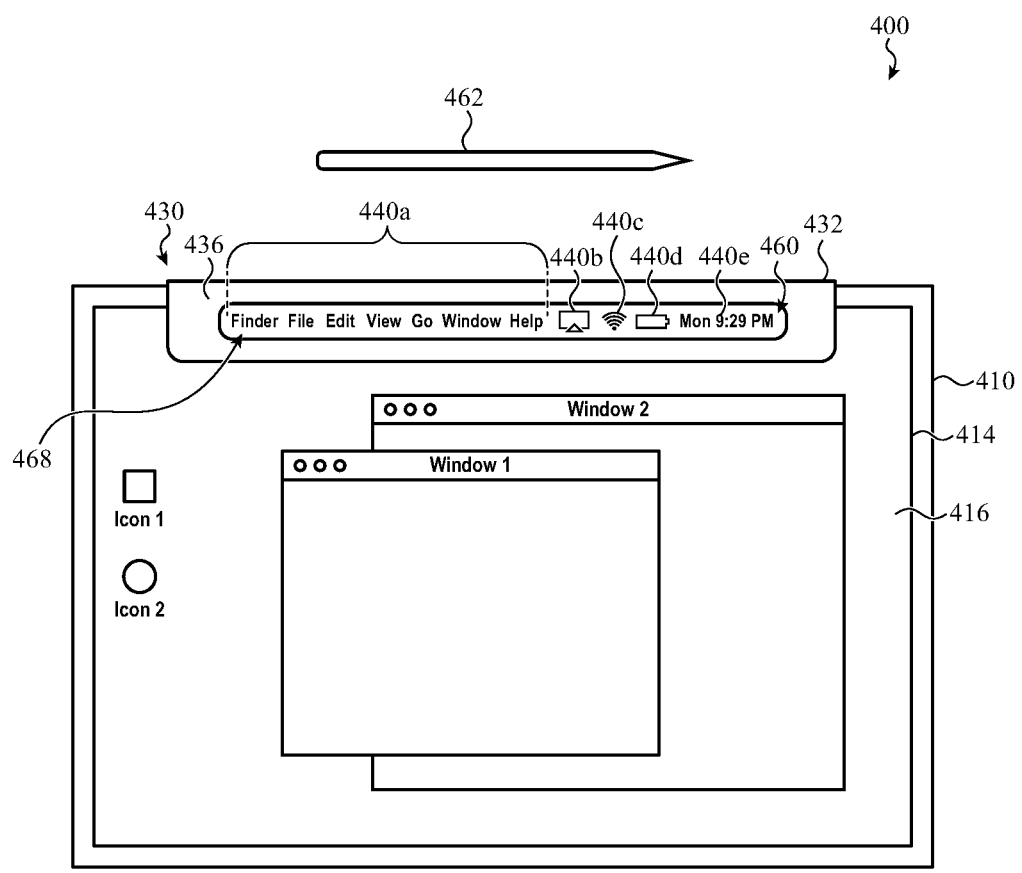
Figure 4C:
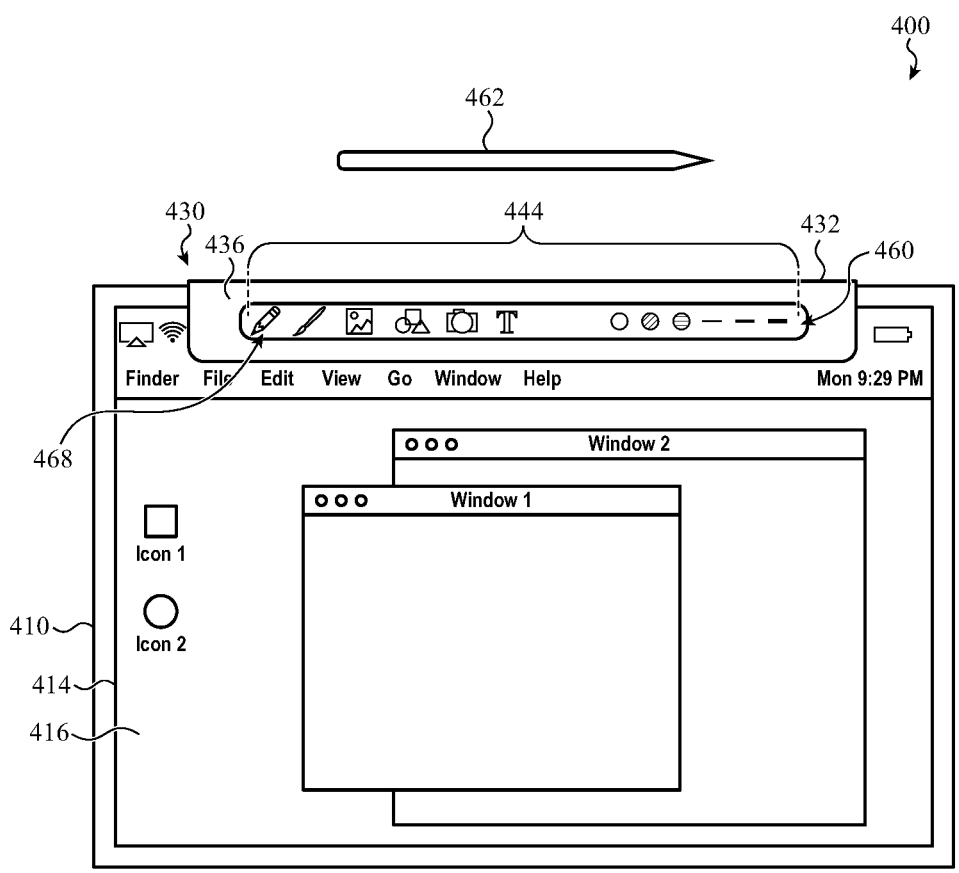

In some cases, the coupling mechanisms described herein may define a recess for receiving a stylus that may be used to provide inputs to the tablet computing device. FIGS. 4A-4C show a tablet computing device 410 that is coupled to an accessory device by a coupling mechanism 430 that defines a recess 460 for receiving a stylus 462. The recess 460 may be defined along a surface 436 defined by a second body section 432 of the coupling mechanism 430. The tablet computing device 410 and the coupling mechanism 430 may be parts of a system 400 that has the same or similar structure and/or functionality as the systems described herein (e.g., systems 100, 200, and 300). The stylus 462 may be used to provide inputs to a touchscreen display 414 of the tablet computing device 410.

The stylus 462 may be capable of being magnetically coupled to the tablet computing device 410. The tablet computing device 410 may include one or more magnetic elements (e.g., magnetic element 466) and the stylus 462 may include one or more magnetic elements (e.g., magnetic element 464) for magnetically coupling the stylus to the tablet computing device. As used herein, a "magnetic element" may be or include a permanent magnet (e.g., formed of or including a magnetic material), an electromagnet, or it may be or include a ferromagnetic element (e.g., formed of or including ferromagnetic material) that does not produce a magnetic field absent the influence of another magnetic field. Example magnetic materials include, but are not limited to, magnetized iron, nickel, and/or cobalt alloys (e.g., steel), ferrite, or other suitable materials. Example ferromagnetic materials include, but are not limited to, non-magnetized iron, nickel, and/or cobalt alloys (e.g., steel), ferrite, or other suitable materials.

The recess 460 of the coupling mechanism 430 may be configured to align at least a part of the stylus 462 (e.g., the magnetic element 464) with the magnetic element 466 of the tablet computing device 410 and/or maintain an alignment between the stylus and the magnetic element 466 to facilitate the magnetic coupling of the stylus with the tablet computing device. FIG. 4A shows the system 400 in a second installation mode in which the second body section 432 of the coupling mechanism 430 extends along and covers a portion of a front exterior surface 416 of the tablet computing device 410. The magnetic element 466 may be positioned beneath or integrated with the touchscreen display 414 such that the stylus 462 covers a portion of the touchscreen display 414 when it is positioned in the recess and magnetically coupled to the tablet computing device 410. In a first installation mode in which the coupling mechanism 430 extends along a rear exterior surface opposite the front exterior surface, the stylus 462 may be magnetically coupled to a magnetic element positioned beneath the rear exterior surface of the tablet computing device 410.

The stylus 462 may additionally or alternatively be wirelessly charged by the tablet computing device 410. The stylus 462 may include one or more wireless charging coils 470 and the tablet computing device 410 may include one or more wireless charging coils 472. The wireless charging coils 470, 472 may be inductively coupled to one another to provide wireless charging of the stylus 462. The recess 460 of the coupling mechanism 430 may be configured to align at least a part of the stylus 462 (e.g., the wireless charging coil 470) with the wireless charging coil 472 of the tablet computing device 410 and/or maintain an alignment between the stylus and the wireless charging coil 472 to facilitate wireless power transfer between the tablet computing device and the stylus. In a second installation mode (e.g., as shown in FIG. 4A), the wireless charging coil 472 may be positioned beneath or integrated with the touchscreen display 414. In a first installation mode in which the coupling mechanism 430 extends along a rear exterior surface opposite the front exterior surface, the stylus 462 may receive wireless power from a wireless charging coil positioned beneath the rear exterior surface of the tablet computing device 410. Additionally or alternatively, the coupling mechanism 430 may include a wireless charging coil positioned beneath the surface 436. The stylus 462 may receive wireless power from the wireless charging coil when it is installed in the recess 460.

Absent a portion of the touchscreen display 414 being covered (e.g., in the first installation mode), the graphical output of the touchscreen display 414 may be similar to the graphical output of the touchscreen display 214 shown in FIG. 2A. In the second installation mode shown in FIG. 4A, the graphical output of the touchscreen display may be altered, similar to the graphical output of the touchscreen display 214 shown in FIG. 2B.

In various embodiments, the stylus 462 may be removed from the recess 460, for example for use by a user in providing inputs to the touchscreen display 414. FIGS. 4B and 4C show the stylus 462 absent from the recess 460. The recess 460 for receiving the stylus 462 may be or include a hole that extends all the way through the second body section 432 of the coupling mechanism 430. The hole may extend from the surface 436 to a surface (not shown in FIGS. 4A-4C; similar to the surface 134 of FIG. 1A) of the second body section 432 opposite the surface 436. In states in which the coupling mechanism 430 covers a portion of the touchscreen display 414 of the tablet computing device 410 (e.g., the second installation mode shown in FIGS. 4A-4C), a display region 468 of the touchscreen display 414 may be viewable through the hole.

In some cases, the coupling mechanism 430 may include an insert portion positioned in a hole extending through the second body section 432. The insert portion may at least partially define the recess. The second body section 432 may be formed from a metal material, and the insert portion may be formed from a non-metallic material that allows the magnetic coupling between the stylus 462 and the magnetic element 466.

The tablet computing device 410 may include a processing unit that is capable of detecting whether the stylus 462 is installed in the recess 460 or absent from the recess. The tablet computing device 410 may include a sensor for use in detecting whether the stylus 462 is installed in the recess 460 or absent from the recess. In some cases, a portion of the graphical output that is displayed in the display region 468 may change depending on whether the stylus 462 is installed in the recess 460 or absent from the recess. As shown in FIG. 4B, in response to the processing unit detecting that the stylus 462 is absent from the recess (e.g., the stylus 462 has been removed or is otherwise not installed in the recess), the processing unit may cause one or more user interface elements (e.g., user interface elements 440a-e) to be displayed in the display region 468 that is viewable through the hole. The processing unit may cause the user interface elements to be moved as described above, in which they are removed from a first region of the touchscreen display 414 and displayed in the display region 468.

In some cases, in response to detecting that the stylus 462 is absent from the recess 460, the processing unit may cause one or more user interface elements (e.g., user interface elements 444) that are not displayed on the touchscreen display 414 when the stylus is installed in the recess to be displayed in the display region 468. The user interface elements 444 may correspond to one or more functions of the stylus 462. For example, the user interface elements 444 may correspond to drawing or editing functions that may be performed using the stylus 462, including a brush style, ink colors, line thickness, shapes, and the like.

Figure 5:
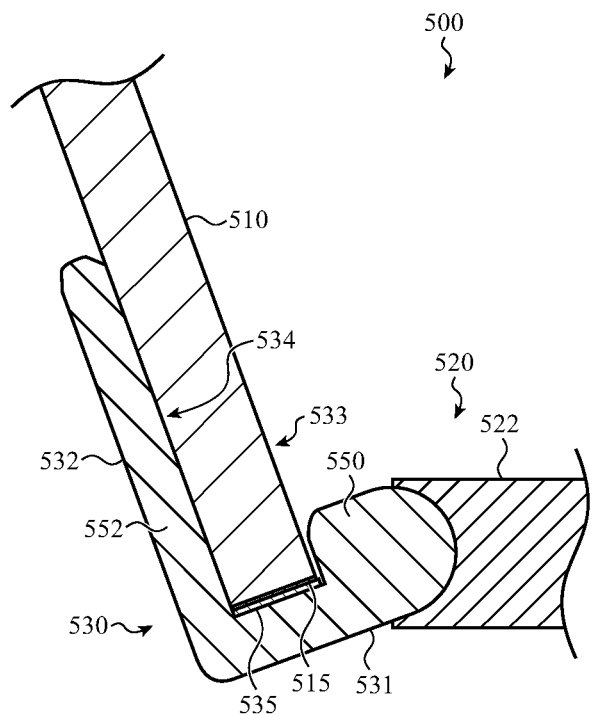
FIG. 5 shows an example partial cross-section view of a tablet computing device that is rotatably coupled to a base portion of an accessory device by a coupling mechanism.

FIG. 5 shows an example partial cross-section view of a tablet computing device 510 that is rotatably coupled to a base portion 522 of an accessory device 520 by a coupling mechanism 530. The cross-section view shown in FIG. 5 may be the same or similar as a cross-section view taken through section line A-A of FIG. 1B. The tablet computing device 510, the accessory device 520, and the coupling mechanism 530 may be parts of a system 500 that has the same or similar structure and/or functionality as the systems described herein (e.g., systems 100, 200, 300, and 400).

As shown in FIG. 5, the coupling mechanism 530 may include a first body section 531 that is rotatably coupled to the base portion 522, and a second body section 532 that extends from the first body section. The first body section 531 and/or the second body section 532 may at least partially define an attachment interface for retaining the tablet computing device 510 to the base portion 522. The second body section 532 may additionally define a first surface 534 that extends along an exterior surface (e.g., a front exterior surface or a rear exterior surface, depending on the installation mode) of the tablet computing device 510 when the tablet computing device 510 is retained to the base portion 522 by the attachment interface. The attachment interface may include a retention channel 533 that is defined by the coupling mechanism 530 for receiving the tablet computing device 510. The first body section 531 may define a first wall 550 of the retention channel 133, and the second body section 532 may define a second wall 552 of the retention channel. As shown in FIG. 5B, a portion of the tablet computing device 510 may be positioned between the first wall 550 and the second wall 552.

The coupling mechanism 530 may include an electrical connector 535 configured to operably couple the accessory device 520 to the tablet computing device 510. The electrical connector 535 may be positioned within the retention channel 533 of the coupling mechanism. The tablet computing device 510 may have a corresponding electrical connector 515 such that when the tablet computing device is installed in the retention channel 533, a connection is made that operably couples the accessory device 520 and the tablet computing device 510.

Figure 6A:
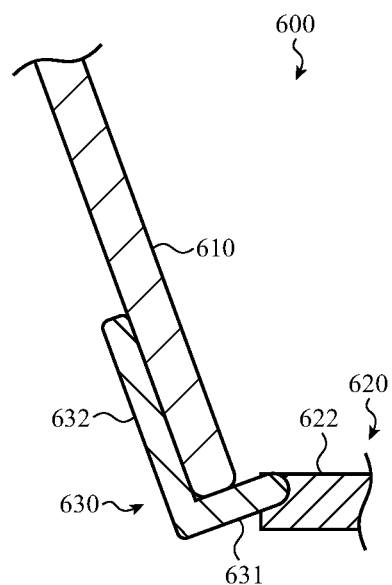
FIGS. 6A-6B show example partial cross-section views of a tablet computing device that is rotatably coupled to a base portion of an accessory device by a coupling mechanism having a retractable wall.
Figure 6B:
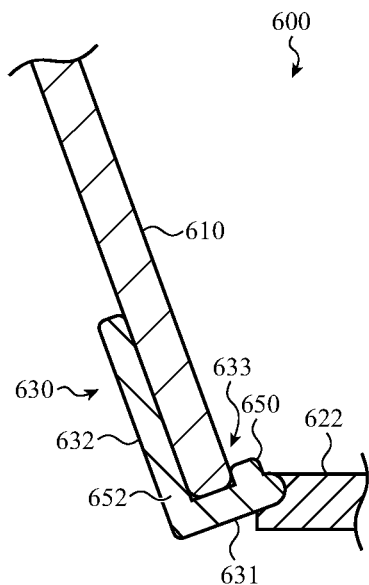

In some cases, one or more of the walls of the retention channel may be retractable to facilitate installation and removal of the tablet computing device from the retention channel. FIGS. 6A-6B show example partial cross-section views of a tablet computing device 610 that is rotatably coupled to a base portion 622 of an accessory device 620 by a coupling mechanism 630 having a retractable wall 652. The cross-section view shown in FIG. 6 may be the same or similar as a cross-section view taken through section line A-A of FIG. 1B. The tablet computing device 610, the accessory device 620, and the coupling mechanism 630 may be parts of a system 600 that has the same or similar structure and/or functionality as the systems described herein (e.g., systems 100, 200, 300, 400, and 500).

As shown in FIG. 6A, in an extended state, a first body section 631 may define a first wall 650 of a retention channel 633, and a second body section 632 may define a second wall 652 of the retention channel. As shown in FIG. 6B, in a retracted state, the first wall 650 may be retracted such that the retention channel 533 is not formed. This may facilitate easier installation and removal of the tablet computing device 610 in the coupling mechanism 630. In response to a processing unit operably coupled to and/or positioned within the accessory device 620 detecting that the tablet computing device 610 is not contacting (e.g., is absent from) the coupling mechanism 630, the processing unit may cause the wall to retract and/or maintain the retracted state as shown in FIG. 6B. In response to the processing unit detecting that the tablet computing device 610 is contacting the coupling mechanism 630, the processing unit may cause the wall 650 to extend to the extended state shown in FIG. 6A. Further in response to the processing unit detecting an indication that the user wishes to remove the tablet computing device 610 from the coupling mechanism 630, the processing unit may cause the wall 650 to retract to the retracted state as shown in FIG. 6B. The coupling mechanism 630 may include a push-push mechanism and/or a hinged or pivoting member that allows a user to indicate that the user wishes to remove the tablet computing device 610 from the coupling mechanism.

Figure 7A:
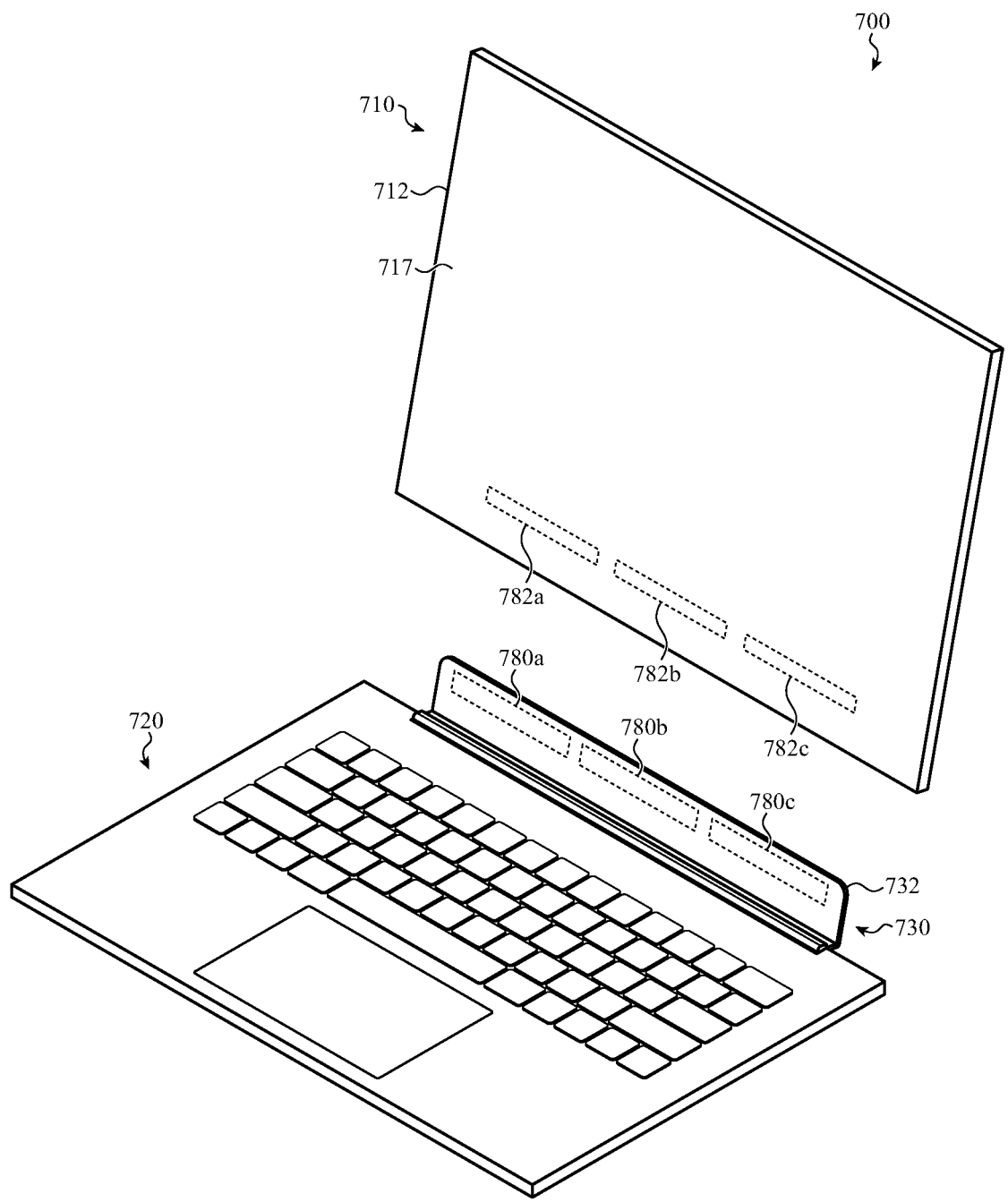
FIGS. 7A-7C show a tablet computing device that is coupled to an accessory device by a coupling mechanism that includes magnetic elements for magnetically coupling a tablet computing device to the coupling mechanism.
Figure 7B:
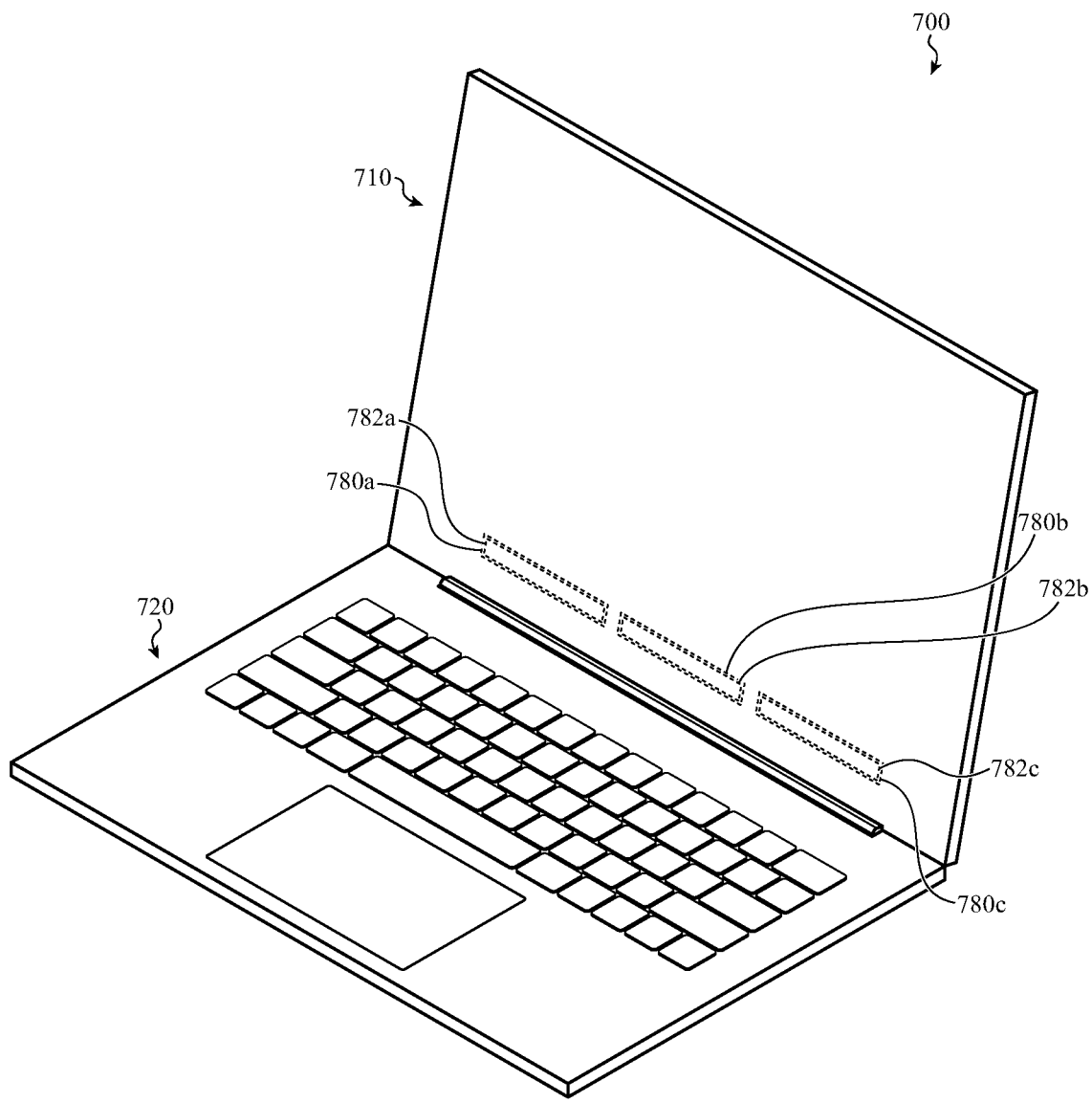
Figure 7C:
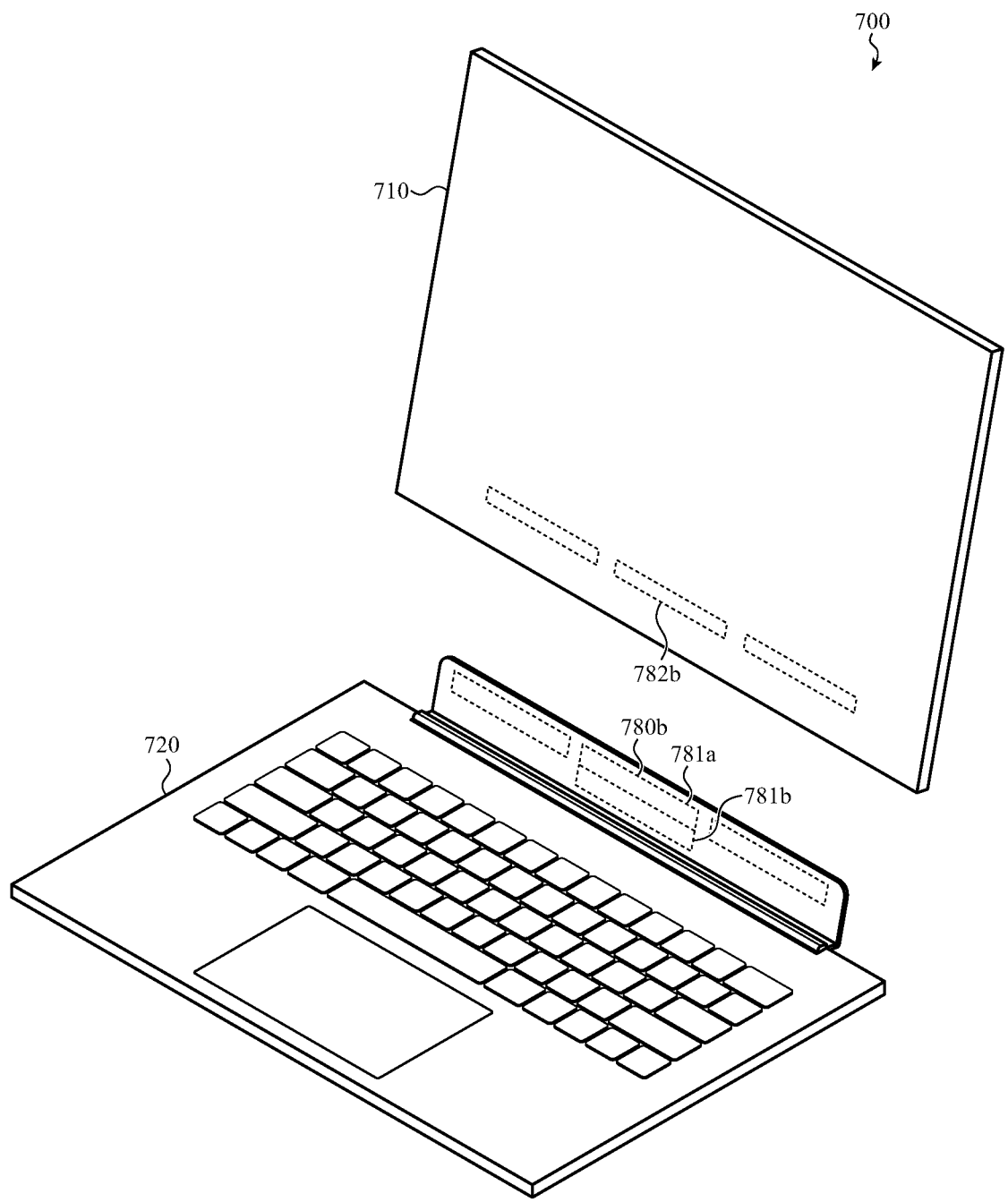

In some cases, the attachment interface of the coupling mechanisms described herein may include one or more magnetic elements for magnetically coupling a tablet computing device to the coupling mechanism. FIGS. 7A-7C show an example coupling mechanism 730 that includes magnetic elements 780*a-c* for magnetically coupling a tablet computing device 710 to the coupling mechanism 730. The tablet computing device 710, the accessory device 720, and the coupling mechanism 730 may be parts of a system 700 that has the same or similar structure and/or functionality as the systems described herein (e.g., systems 100, 200, 300, 400, 500, and 600).

The magnetic elements 780*a-c* may be coupled to, within, or integrally formed with a second body section 732 of the coupling mechanism 730. The tablet computing device 710 may include one or more magnetic elements 782*a-c* that are configured to be aligned with the magnetic elements 780*a-c* when the tablet computing device is coupled to the coupling mechanism 730, as shown in FIG. 7B. The magnetic elements 782*a-c* may be coupled to, within, or integrally formed with a housing 712 of the tablet computing device 710, and may facilitate magnetic coupling with the coupling mechanism 730 along an exterior surface 717 (e.g., the front exterior surface and/or the rear exterior surface) of the tablet computing device.

In some cases, a magnetic flux of one or more of the magnetic elements 780*a-c*, 782*a-c* may be controllable to facilitate installation and removal of the tablet computing device from the retention channel. A processing unit operably coupled to the magnetic elements 780*a-c*, 782*a-c* may control a flux to change a magnetic force exerted by the magnetic elements on one another. For example, a magnetic element 780*b* may be an electromagnet, the flux of which corresponds to an electrical current applied to the electromagnet. In a first state, the electromagnet may not be energized, so the magnetic element 782*b* may not be attracted to the magnetic element 780*b*. This may reduce the overall magnetic force between the coupling mechanism 730 and the tablet computing device 710 to improve a user experience associated with installing or removing the tablet computing device. In a second state, the electromagnet may be energized, so the magnetic element 782*b* is attracted to the magnetic element 780*b*, thereby increasing the overall magnetic force between the coupling mechanism 730 and the tablet computing device 710. This may help to retain the tablet computing device 710 coupled to the coupling mechanism 730.

In some cases, one or more magnetic elements 780*a-c* may be capable of exerting a repulsive force to repel one or more magnets 782*a-c*. For example, the magnetic element 780*b* may be controllable to reverse a polarity of the magnetic flux produced by the magnetic element 780*b* to transition between the first and second states discussed above. In the first state, the magnetic element 780*b* may repel the magnetic element 782*b*. This may reduce the overall magnetic force between the coupling mechanism 730 and the tablet computing device 710 to improve a user experience associated with installing or removing the tablet computing device. In a second state, the magnetic element 780*b* may attract the magnetic element 782*b*. This may help to retain the tablet computing device 710 coupled to the coupling mechanism 730.

In response to a processing unit operably coupled to and/or positioned within the accessory device 720 detecting that the tablet computing device 710 is not contacting (e.g., is absent from) the coupling mechanism 730, the processing unit may cause the electromagnet to not be energized. In response to the processing unit detecting that the tablet computing device 710 is contacting the coupling mechanism 730, the processing unit may cause a current to be applied to the electromagnet to energize the electromagnet. Further in response to the processing unit detecting an indication that the user wishes to remove the tablet computing device 710 from the coupling mechanism 730, the processing unit may cause the current to be ceased.

In some cases, one or more magnetic elements 780*a-c* may be capable of moving to reduce the magnetic force between the tablet computing device 710 and the coupling mechanism 730. For example, as shown in FIG. 7C, the magnetic element 780*b* may move between a first position 781*a* and a second position 781*b*. When the magnetic element 780*b* is in the first position 781*a*, the magnetic element 780*b* may be aligned with the magnetic element 782*b* when the tablet computing device 710 is installed. When the magnetic element 780*b* is in the position 781*b*, the magnetic element 780*b* may not be aligned with the magnetic element 782*b* when the tablet computing device is installed. As a result the magnetic element 782*b* may not be attracted to the magnetic element 780b, thereby reducing the magnetic force between the tablet computing device 710 and the coupling mechanism 730.

In response to a processing unit operably coupled to and/or positioned within the accessory device 720 detecting that the tablet computing device 710 is not contacting (e.g., is absent from) the coupling mechanism 730, the processing unit may cause the magnetic element 780*b* to move to and/or maintain the second position 781*b*. In response to the processing unit detecting that the tablet computing device 710 is contacting the coupling mechanism 730, the processing unit may cause the magnetic element 780*b* to move to and/or maintain the first position 781*a*. Further in response to the processing unit detecting an indication that the user wishes to remove the tablet computing device 710 from the coupling mechanism 730, the processing unit may cause the magnetic element 780*b* to move to and/or maintain the second position 781*b*.

Figure 8A:
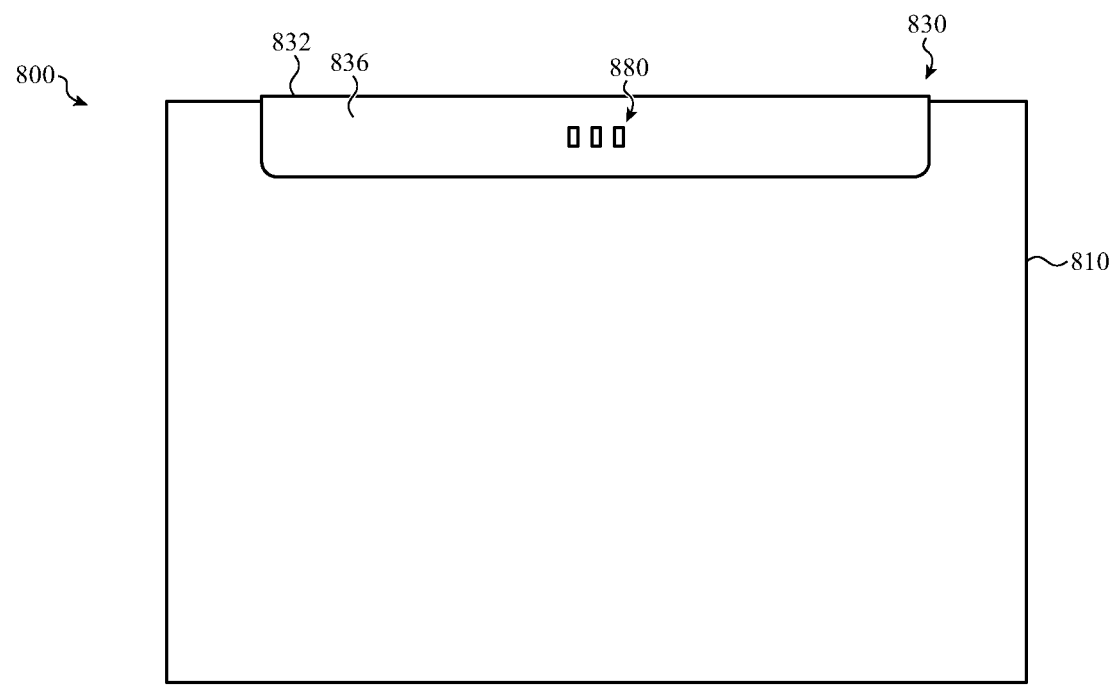
FIGS. 8A and 8B show a tablet computing device that is coupled to an accessory device by a coupling mechanism that includes a connection interface for connecting a companion device to the coupling mechanism.
Figure 8B:
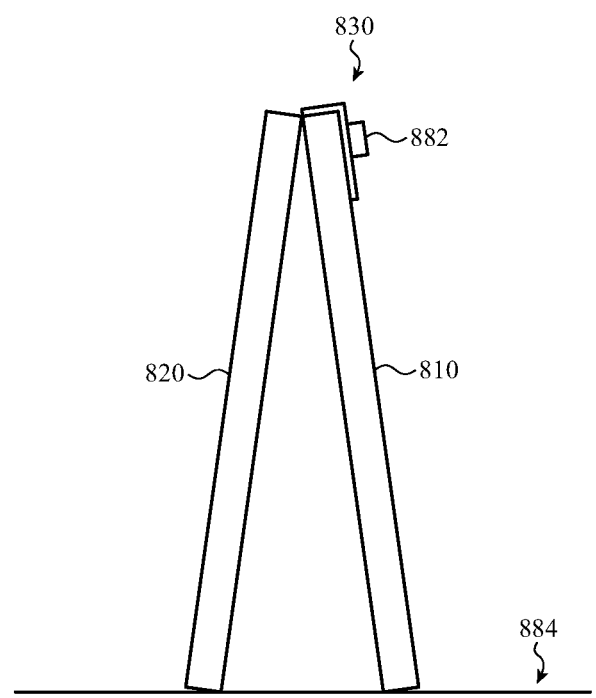

In some cases, the coupling mechanisms described herein may include a connection interface for connecting companion devices to the coupling mechanisms. FIGS. 8A and 8B show a tablet computing device 810 that is coupled to an accessory device 820 by a coupling mechanism 830 that includes a connection interface 880 for connecting a companion device 882 to the coupling mechanism. The tablet computing device 810, the accessory device 820, and the coupling mechanism 830 may be parts of a system 800 that has the same or similar structure and/or functionality as the systems described herein (e.g., systems 100, 200, 300, 400, 500, 600, and 700).

A second body section 832 of the coupling mechanism 830 may extend along (e.g., cover a portion of) an exterior surface (e.g., a front exterior surface or a rear exterior surface) of a tablet computing device 810. The coupling mechanism 830 defines a second surface 836 opposite a first surface that extends along the tablet computing device 810. The connection interface 880 may facilitate connection of a companion device 882 along the second surface 836. The companion device 882 may be operably coupled to the tablet computing device 810 (e.g., via the accessory device 820 or separately), and may be used to provide inputs to the tablet computing device or outputs controlled by the tablet computing device. The companion device 882 may include a camera, a microphone, a display, a projector, a light, or any other suitable device. The connection interface 880 may include one or more electrical connectors (e.g., pins, contacts, and the like) for operably coupling the companion device 882 to the accessory device 820. The connection interface 880 may further include one or more physical coupling mechanisms for physically coupling the companion device 882 to the accessory device 820.

In some cases, the tablet computing device 810 and the accessory device 820 may cooperate to act as a stand for the companion device 882. For example, as shown in FIG. 8B, the tablet computing device 810 and the accessory device 820 may be placed on a surface 884 such that the companion device 882 is oriented in a particular way. This may be useful in embodiments in which the companion device is a camera, as the system 800 may replace a tripod or other camera stand.

Figure 9:
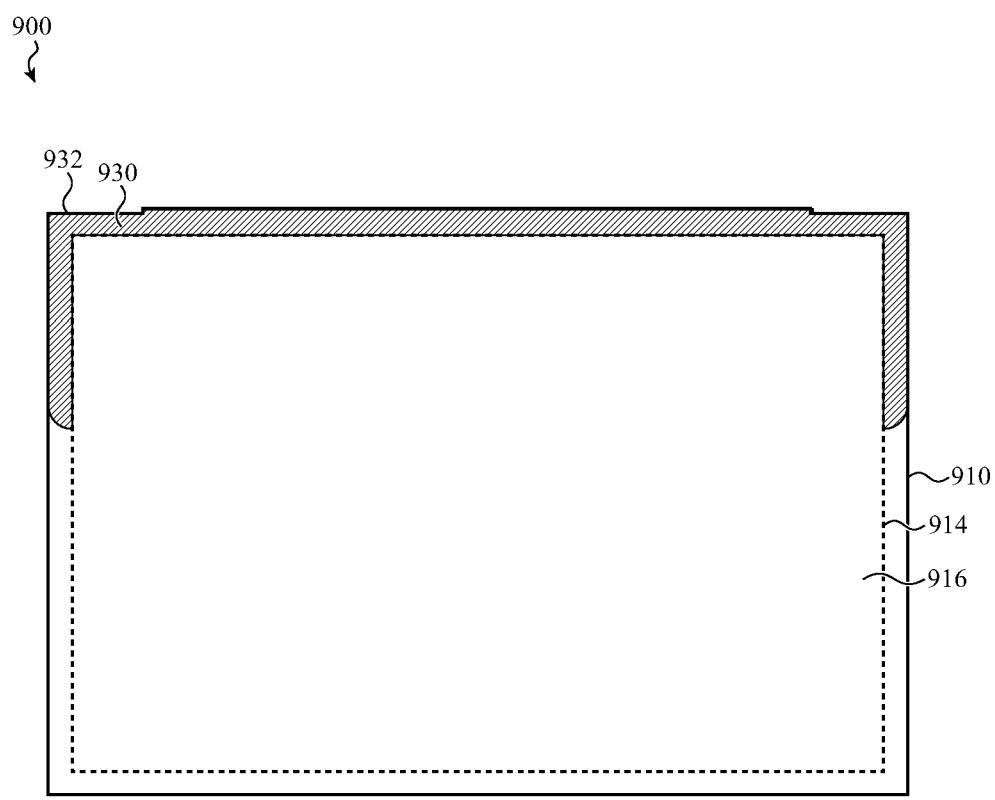
FIG. 9 shows a tablet computing device that is coupled to an accessory device by a coupling mechanism that is shaped to extend at least partially around a touchscreen display.

As noted herein, in some cases, a coupling mechanism may cover a display. In other embodiments, the coupling mechanisms described herein may be shaped such that they do not cover a display. FIG. 9 shows a tablet computing device 910 that is coupled to an accessory device by a coupling mechanism 930 that is shaped to extend at least partially around a touchscreen display 914. The tablet computing device 910, the accessory device, and the coupling mechanism 930 may be parts of a system 900 that has the same or similar structure and/or functionality as the systems described herein (e.g., systems 100, 200, 300, 400, 500, 600, 700, and 800). A body section 932 of the coupling mechanism 930 may be shaped such that in a second installation mode in which the body section extends along a front exterior surface 916 of the tablet computing device 910, the body section 932 does not cover the touchscreen display 914. As shown in FIG. 9, the body section 932 may at least partially surround the touchscreen display 914. This may allow the body section 932 to provide enough support to retain the tablet computing device to the coupling mechanism 930 without covering the touchscreen display 914.

Figure 10:
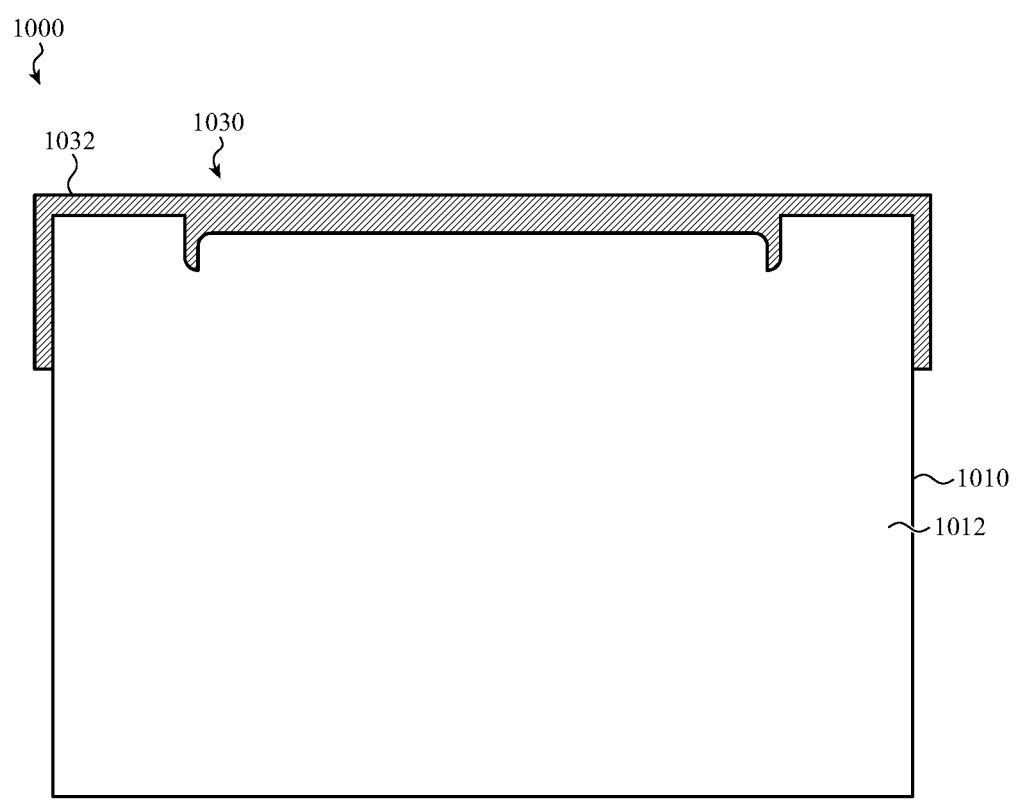
FIG. 10 shows a tablet computing device that is coupled to an accessory device by a coupling mechanism that is shaped to extend at least partially around a housing of the tablet computing device.

In some cases, the coupling mechanisms described herein may extend at least partially around a housing of a tablet computing device. FIG. 10 shows a tablet computing device 1010 that is coupled to an accessory device by a coupling mechanism 1030 that is shaped to extend at least partially around a housing 1012 of the tablet computing device. The tablet computing device 1010, the accessory device, and the coupling mechanism 1030 may be parts of a system 1000 that has the same or similar structure and/or functionality as the systems described herein (e.g., systems 100, 200, 300, 400, 500, 600, 700, 800, and 900). A body section 1032 of the coupling mechanism 1030 may be shaped such that it at least partially surrounds the housing 1012 of the tablet computing device 1010. This may allow an amount of a touchscreen display of the tablet computing device 1010 that is covered by the coupling mechanism 1030 to be reduced or eliminated. The portion of the coupling mechanism 1030 that extends around the housing 1012 of the tablet computing device 1010 may cover a portion of the housing 1012 (e.g., one or more sidewalls) to protect the tablet computing device from drops or other impacts.

Figure 11:
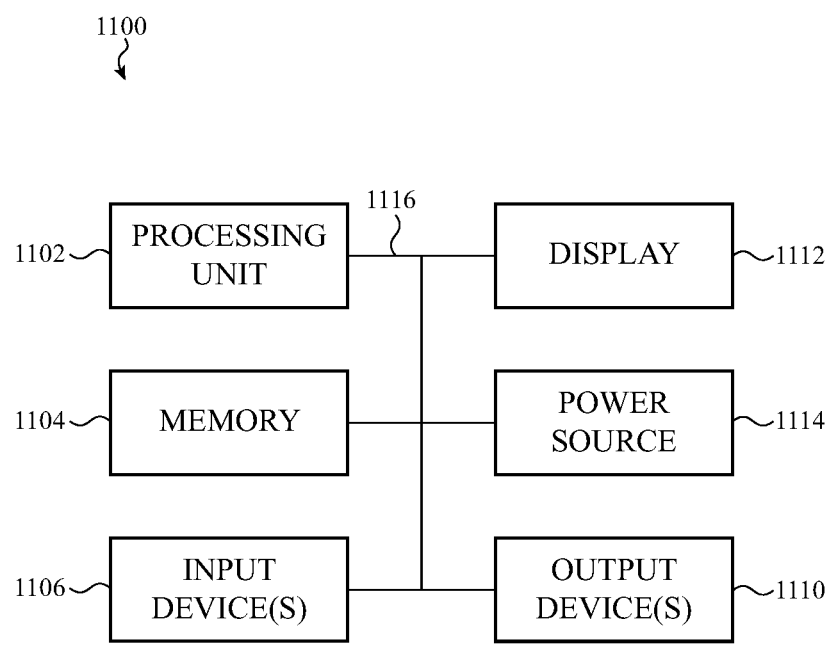
FIG. 11 shows a sample electrical block diagram of an electronic device.

FIG. 11 shows a sample electrical block diagram of an electronic device 1100. The electronic device may in some cases take the form of any of the electronic devices described with reference to FIGS. 1A-10 (e.g., tablet computing devices, accessory devices, companion devices, and the like) or other portable electronic devices. The electronic device 1100 can include a display 1112 (e.g., a light-emitting display, an electronic ink display, etc.), a processing unit 1102, a power source 1114, a memory 1104 or storage device, an input device 1106 (e.g., a keyboard, a trackpad, a touchscreen, etc.), and an output device 1110.

The processing unit 1102 can control some or all of the operations of the electronic device 1100. The processing unit 1102 can communicate, either directly or indirectly, with some or all of the components of the electronic device 1100. For example, a system bus or other communication mechanism 1116 can provide communication between the processing unit 1102, the power source 1114, the memory 1104, the input device(s) 1106, and the output device(s) 1110.

The processing unit 1102 can be implemented as any electronic device capable of processing, receiving, or transmitting data or instructions. For example, the processing unit 1102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1112) may be controlled by a second processing unit, where the first and second processing units may or may not be in communication with each other. In some cases, the processing unit 1102 may determine a biological parameter of a user of the electronic device (e.g., an ECG for the user).

In some cases, the electronic device 1100 does not include its own processing unit, but instead is controlled by one or more processing units of devices that are operably coupled to the electronic device. For example, the accessory devices discussed herein may not include a processing unit, and may be controlled by a processing unit of a tablet computing device that is coupled to or otherwise operably coupled to the accessory device.

The power source 1114 can be implemented with any device capable of providing energy to the electronic device 1100. For example, the power source 1114 may be one or more batteries or rechargeable batteries. Additionally or alternatively, the power source 1114 can be a power connector or power cord that connects the electronic device 1100 to another power source (e.g., a wall outlet).

The memory 1104 can store electronic data that can be used by the electronic device 1100. For example, the memory 1104 can store electrical data or content (e.g., audio and video files, documents and applications, device settings and user preferences, timing signals, control signals, and data structures or databases). The memory 1104 can be configured as any type of memory. By way of example only, the memory 1104 can be implemented as random access memory, read-only memory, Flash memory, removable memory, other types of storage elements, or combinations of such devices.

In various embodiments, the display 1112 provides a graphical output, for example associated with an operating system, user interface, and/or applications of the electronic device 1100. The display 1112 may be a touchscreen display of a tablet computing device, an auxiliary display of an accessory device, or the like. In one embodiment, the display 1112 includes one or more sensors and is configured as a touch-sensitive (e.g., single-touch, multi-touch) and/or force-sensitive display to receive inputs from a user. For example, the display 1112 may be integrated with a touch sensor (e.g., a capacitive touch sensor) and/or a force sensor to provide a touch-and/or force-sensitive display. The display 1112 is operably coupled to the processing unit 1102 of the electronic device 1100.

The display 1112 can be implemented with any suitable technology, including, but not limited to liquid crystal display (LCD) technology, light emitting diode (LED) technology, organic light-emitting display (OLED) technology, organic electroluminescence (OEL) technology, electronic paper (e.g., electronic ink) display technology, or another type of display technology. In some cases, the display 1112 is positioned beneath and viewable through a cover that forms at least a portion of an enclosure of the electronic device 1100.

In various embodiments, the input devices 1106 may include any suitable components for detecting inputs. Examples of input devices 1106 include keyboards, trackpads, touchscreens, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input device(s) 1106 include a touch sensor (e.g., a capacitive touch sensor) integrated with the display 1112 to provide a touch-sensitive display. Similarly, in some cases, the input device(s) 1106 include a force sensor (e.g., a capacitive force sensor) integrated with the display 1112 to provide a force-sensitive display.

The output devices 1110 may include any suitable components for providing outputs. Examples of output devices 1110 include audio output devices (e.g., speakers), visual output devices (e.g., lights or displays), tactile output devices (e.g., haptic output devices), communication devices (e.g., wired or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network (e.g., a wireless and/or wired network connection). Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

As described above, one aspect of the present technology is receiving data, and the like. The present disclosure contemplates that in some instances this data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws (e.g., the Health Insurance Portability and Accountability Act ("HIPAA")); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information (e.g., events or states at the device associated with a user, other non-personal information, or publicly available information).

What is claimed is:

1. An accessory device for a tablet computing device, comprising:
   a base portion comprising a keyboard having a set of electromechanical keys; and
   a coupling mechanism positioned along a side of the keyboard and configured to rotatably couple the base portion to the tablet computing device having a touchscreen display, the coupling mechanism configured to retain the tablet computing device in a first orientation in a first installation mode and a second orientation in a second installation mode, the coupling mechanism comprising:
      a first body section rotatably coupled to the base portion;
      a second body section extending from the first body section, the second body section configured to:
         cover a portion of a rear exterior surface of the tablet computing device in the first installation mode; and
         cover a portion of a front exterior surface of the tablet computing device opposite the rear exterior surface in the second installation mode, the portion of the front exterior surface corresponding to a portion of the touchscreen display; and an auxiliary display coupled to the second body section and configured to provide a graphical output.

2. The accessory device of claim 1, wherein:
the first body section defines a first wall of a retention channel configured to receive the tablet computing device;
the second body section defines a second wall of the retention channel; and
the coupling mechanism further comprises an electrical connector positioned within the retention channel and configured to operably couple the accessory device to the tablet computing device.

3. The accessory device of claim 1, wherein:
the graphical output is a first graphical output;
the touchscreen display is configured to provide a second graphical output;
the auxiliary display is operably coupled to a processing unit of the tablet computing device;
in the first installation mode, the second graphical output of the touchscreen display comprises a user interface element; and
in the second installation mode in which the coupling mechanism covers the portion of the front exterior surface corresponding to the touchscreen display, the first graphical output comprises the user interface element.

4. The accessory device of claim 3, wherein:
the auxiliary display comprises a touch sensor that is configured to receive a touch input; and
the second graphical output is responsive to the touch input.

5. The accessory device of claim 1, wherein:
the coupling mechanism comprises a first magnetic element;
the tablet computing device comprises a second magnetic element; and
the first magnetic element is configured to align with the second magnetic element to retain the tablet computing device in at least one of the first orientation or the second orientation.

6. The accessory device of claim 1, wherein the auxiliary display is configured to maintain a static graphical output while in a powerless state.

7. The accessory device of claim 1, wherein:
the auxiliary display is operably coupled to a processing unit of the tablet computing device; and
the graphical output corresponds to at least one of:
a battery level of the tablet computing device;
a user account of the tablet computing device; or
an alert provided by the tablet computing device.

8. A system comprising:
a tablet computing device comprising:
a touchscreen display configured to provide a graphical output that is viewable along a first exterior surface of the tablet computing device; and
a magnetic element;
a stylus configured to provide an input at the touchscreen display, the stylus configured to magnetically couple to the magnetic element of the tablet computing device; and
an accessory device, comprising:
a base portion comprising a keyboard; and
a coupling mechanism configured to rotatably couple the base portion to the tablet computing device, the coupling mechanism defining:
a first surface configured to:
partially cover the first exterior surface of the tablet computing device in a first installation mode; and
partially cover a second exterior surface of the tablet computing device opposite the first exterior surface in a second installation mode; and
a second surface opposite the first surface, the second surface defining a recess that is configured to receive the stylus and maintain alignment between the stylus and the magnetic element.

9. The system of claim 8, wherein:
the recess comprises a hole that extends from the first surface to the second surface; and
in the second installation mode:
the coupling mechanism covers a portion of the touchscreen display; and
a first display region of the touchscreen display is viewable through the hole.

10. The system of claim 9, wherein:
the tablet computing device comprises a processing unit configured to:
detect that the stylus is absent from the recess; and
in response to detecting that the stylus is absent from the recess, modify the graphical output to move a user interface element to the first display region.

11. The system of claim 10, wherein the user interface element corresponds to a function of the stylus.

12. The system of claim 8, wherein, when the system is in a folded configuration:
in the first installation mode, the touchscreen display faces towards the keyboard; and
in the second installation mode, the touchscreen display faces away from the keyboard.

13. The system of claim 8, wherein:
the tablet computing device further comprises a wireless charging coil for wirelessly charging the stylus.

14. The system of claim 8, wherein:
the coupling mechanism comprises:
a body section formed from a metal material that defines a hole that extends from the first surface to the second surface; and
an insert portion positioned in the hole and configured to allow a magnetic coupling between the stylus and the magnetic element.

15. A system comprising:
a tablet computing device comprising:
a device housing defining a front exterior surface of the tablet computing device and a rear exterior surface of the tablet computing device opposite the front exterior surface; and
a touchscreen display configured to provide a graphical output at a display region defined along the front exterior surface of the tablet computing device;
an accessory device comprising:
a base portion comprising a keyboard; and
a coupling mechanism configured to rotatably couple the tablet computing device to the base portion, the coupling mechanism comprising a body section configured to:
partially cover the rear exterior surface of the tablet computing device in a first installation mode; and
cover a first portion of the display region in a second installation mode; and
a processing unit operably coupled to the touchscreen display and configured to:
detect that the tablet computing device is installed in the second installation mode; and in response to detecting that the tablet computing device is installed in the second installation mode, modify the graphical output to display a user interface element at a second portion of the display region that is not covered by the coupling mechanism.

16. The system of claim 15, wherein:
the system further comprises a stylus configured to magnetically couple to the tablet computing device;
the coupling mechanism defines a recess configured to maintain alignment between the stylus and a magnetic element of the tablet computing device; and
a third portion of the display region is viewable through the recess.

17. The system of claim 16, wherein:
the user interface element is a first user interface element;
the processing unit is further configured to detect that the stylus has been removed from the recess; and
in response to detecting that the stylus has been removed from the recess, modifying the graphical output to display a second user interface element corresponding to a function of the stylus in the third portion of the display region.

18. The system of claim 15, wherein:
the user interface element is a first user interface element;
the graphical output is a first graphical output;
the coupling mechanism further comprises an auxiliary display configured to provide a second graphical output along a surface of the body section; and
in response to detecting that the tablet computing device is installed in the second installation mode, the processing unit is further configured to:
remove a second user interface element from the first portion of the display region; and
display the second user interface element on the auxiliary display.

19. The system of claim 15, wherein:
the tablet computing device comprises a first magnetic element; and
the coupling mechanism comprises a second magnetic element configured to couple the tablet computing device to the accessory device when aligned with the first magnetic element.

20. The system of claim 19, wherein:
the tablet computing device further comprises a third magnetic element;
the coupling mechanism further comprises a fourth magnetic element;
the processing unit is configured to cause the fourth magnetic element to transition between a first state and a second state;
in the first state, the fourth magnetic element is attracted to the third magnetic element; and
in the second state, the fourth magnetic element repels the third magnetic element.

* * * * *